US 12,235,465 B2

(12) United States Patent
Hirano et al.

(10) Patent No.: US 12,235,465 B2
(45) Date of Patent: Feb. 25, 2025

(54) PROJECTION SYSTEM AND PROJECTOR

(71) Applicant: SEIKO EPSON CORPORATION, Tokyo (JP)

(72) Inventors: Hitoshi Hirano, Suwa (JP); Nobutaka Minefuji, Omachi (JP); Koji Shiokawa, Suzaka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 135 days.

(21) Appl. No.: 17/876,806

(22) Filed: Jul. 29, 2022

(65) Prior Publication Data

US 2023/0049785 A1    Feb. 16, 2023

(30) Foreign Application Priority Data

Jul. 30, 2021    (JP) ................. 2021-124881

(51) Int. Cl.
*G02B 27/09*    (2006.01)
*G02B 3/04*    (2006.01)
*H04N 9/31*    (2006.01)

(52) U.S. Cl.
CPC .......... *G02B 27/0955* (2013.01); *G02B 3/04* (2013.01); *H04N 9/3152* (2013.01)

(58) Field of Classification Search
CPC ..... G02B 27/0955; G02B 3/04; H04N 9/3152
USPC ........................................ 359/630
See application file for complete search history.

(56) References Cited

U.S. PATENT DOCUMENTS

2016/0238825 A1*    8/2016  Minefuji ............ G02B 15/1421

FOREIGN PATENT DOCUMENTS

| JP | 2013-120365 A | 6/2013 |
| JP | 2015-114609 A | 6/2015 |
| JP | 2018-005253 A | 1/2018 |

\* cited by examiner

*Primary Examiner* — Wyatt A Stoffa
*Assistant Examiner* — Mitchell T Oestreich
(74) *Attorney, Agent, or Firm* — Oliff PLC

(57) ABSTRACT

A projection system includes a first optical system and a second optical system disposed on an enlargement side of the first optical system. The first optical system includes a first lens group having positive power, a second lens group disposed on the enlargement side of the first lens group and having negative power, and an optical path deflector disposed between the first lens group and the second lens group. The second optical system includes a reflection member having a concave reflection surface. The second lens group includes three aspherical lenses. Conditional Expression (1) below is satisfied, $$0.25 < |F| \times FNO/Y\max < 0.5 \qquad (1)$$

where F represents the focal length of the entirety of the projection system, FNO represents the F number of the projection system, and Ymax represents a maximum image height in a reduction-side conjugate plane.

9 Claims, 14 Drawing Sheets

PROJECTION SYSTEM AND PROJECTOR

The present application is based on, and claims priority from JP Application Serial Number 2021-124881, filed Jul. 30, 2021, the disclosure of which is hereby incorporated by reference herein in its entirety.

BACKGROUND

1. Technical Field

The present disclosure relates to a projection system and a projector.

2. Related Art

JP-A-2018-5253 describes a projector that magnifies a projection image displayed on an image display device and projects the magnified projection image onto a screen via a projection system. The projection system described in JP-A-2018-5253 includes a first refractive optical system, a second refractive optical system, a reflective optical system, and an optical element sequentially arranged from the reduction side to the enlargement side. The first refractive optical system, the second refractive optical system, and the reflective optical system are arranged along a straight line. The reflective optical system is formed of a reflection mirror having a concave reflection surface. The optical element is a transparent parallel flat glass plate.

The first refractive optical system, the second refractive optical system, and the reflective optical system are accommodated in a housing. The optical element is attached to an aperture section provided as part of the housing. In the housing, the light projected from the image display device passes through the first and second refractive optical systems and reaches the reflective optical system. The projected light having reached the reflective optical system is deflected by the concave reflection surface back toward the image display device and reaches the screen via the aperture section. The screen is installed at right angles with respect to the optical axis of the first refractive optical system.

To cause the projector described in JP-A-2018-5253 to project a projection image onto the screen over the shortest projection distance, the first refractive optical system is located immediately below the screen. In other words, to cause the projector described in JP-A-2018-5253 to project a projection image onto the screen over the shortest projection distance, the image display device is located behind the screen, and the second refractive optical system and reflective optical system are located in front of the screen. Therefore, to project a projection image onto the screen over the shortest projection distance, the projector is installed immediately below the screen, and part of the housing protrudes rearward beyond the screen.

The screen is installed in some cases along a wall extending vertically from the floor surface. To perform projection onto the thus installed screen, no portion of the projector can protrude rearward beyond the screen. The projector described in JP-A-2018-5253 cannot therefore project a projection image onto the screen over the shortest projection distance.

SUMMARY

To solve the problem described above, a projection system according to an aspect of the present disclosure that projects an image in a reduction-side conjugate plane onto an enlargement-side conjugate plane includes a first optical system and a second optical system disposed on an enlargement side of the first optical system. The second optical system includes a reflection member having a concave reflection surface, and the first optical system includes a first lens group having positive power, a second lens group disposed on the enlargement side of the first lens group and having negative power, and a deflector disposed between the first lens group and the second lens group. The second lens group includes three aspherical lenses. Conditional Expression (1) below is satisfied, $$0.25 < |F| \times FNO/Y\max < 0.5 \quad (1)$$

where F represents a focal length of entirety of the projection system, FNO represents an F number of the projection system, and Ymax represents a maximum image height in the reduction-side conjugate plane.

A projector according to another aspect of the present disclosure includes a light modulator that is disposed in the reduction-side conjugate plane and modulates light emitted from a light source, and the projection system described above that projects the light modulated by the light modulator.

DESCRIPTION OF EXEMPLARY EMBODIMENTS

A projection system and a projector according to an embodiment of the present disclosure will be described below with reference to the drawings.

Projector

Figure 1:
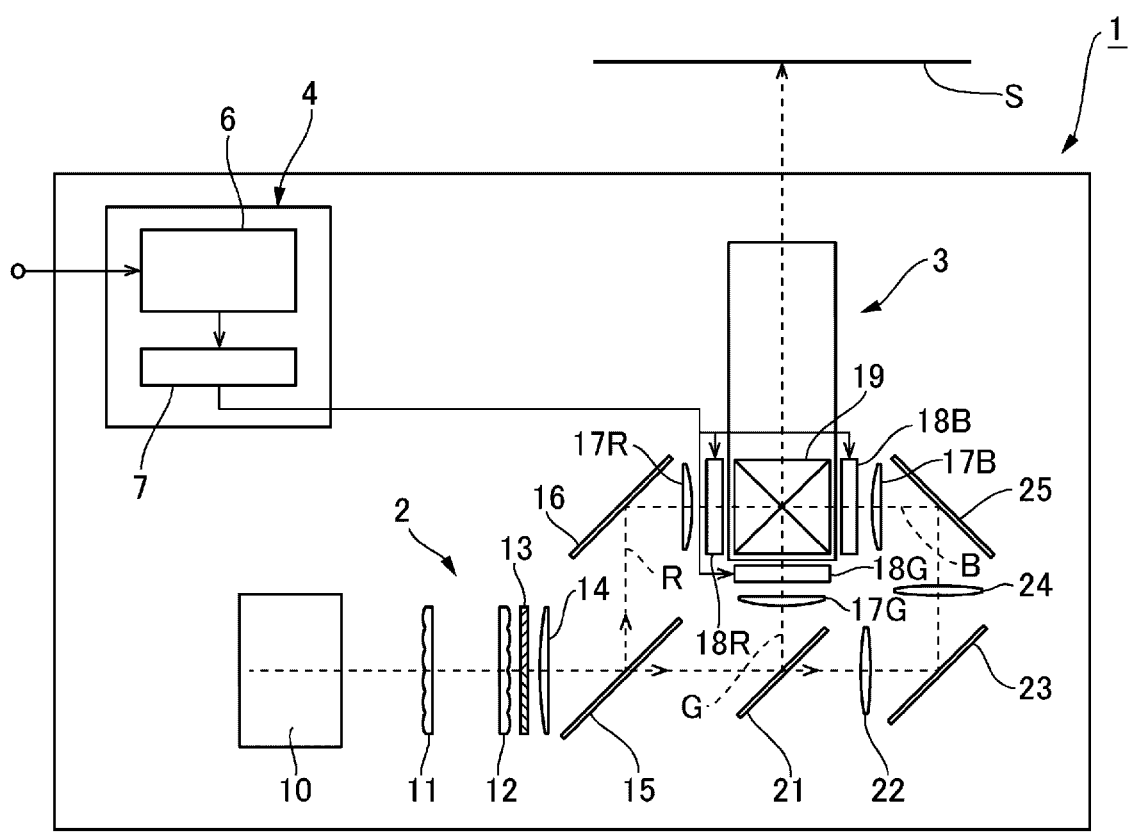
FIG. 1 shows a schematic configuration of a projector including a projection system according to an embodiment of the present disclosure.

FIG. 1 shows a schematic configuration of a projector including a projection system 3 according to the embodiment of the present disclosure. A projector 1 includes an image formation unit 2, which generates a projection image to be projected on a screen S, the projection system 3, which magnifies the projection image and projects the magnified image onto the screen S, and a control unit 4, which controls the operation of the image formation unit 2, as shown in FIG. 1.

Image Formation Unit and Control Unit

The image formation unit 2 includes a light source 10, a first optical integration lens 11, a second optical integration lens 12, a polarization converter 13, and a superimposing lens 14. The light source 10 is formed, for example, of an ultrahigh-pressure mercury lamp or a solid-state light source. The first optical integration lens 11 and the second optical integration lens 12 each include a plurality of lens elements arranged in an array. The first optical integration lens 11 divides a luminous flux from the light source 10 into a plurality of luminous fluxes. The lens elements of the first optical integration lens 11 focus the luminous flux from the light source 10 in the vicinity of the lens elements of the second optical integration lens 12.

The polarization converter 13 converts the light via the second optical integration lens 12 into predetermined linearly polarized light. The superimposing lens 14 superimposes images of the lens elements of the first optical integration lens 11 on one another in a display area of each of liquid crystal panels 18R, 18G, and 18B, which will be described later, via the second optical integration lens 12.

The image formation unit 2 further includes a first dichroic mirror 15, a reflection mirror 16, a field lens 17R, and the liquid crystal panel 18R. The first dichroic mirror 15 reflects R light, which is part of the beam incident via the superimposing lens 14, and transmits G light and B light, which are part of the beam incident via the superimposing lens 14. The R light reflected off the first dichroic mirror 15 travels via the reflection mirror 16 and the field lens 17R and is incident on the liquid crystal panel 18R. The liquid crystal panel 18R is a light modulator. The liquid crystal panel 18R modulates the R light in accordance with an image signal to form a red projection image.

The image formation unit 2 further includes a second dichroic mirror 21, a field lens 17G, and the liquid crystal panel 18G. The second dichroic mirror 21 reflects the G light, which is part of the beam via the first dichroic mirror 15, and transmits the B light, which is part of the beam via the first dichroic mirror 15. The G light reflected off the second dichroic mirror 21 passes through the field lens 17G and is incident on the liquid crystal panel 18G. The liquid crystal panel 18G is a light modulator. The liquid crystal panel 18G modulates the G light in accordance with an image signal to form a green projection image.

The image formation unit 2 further includes a relay lens 22, a reflection mirror 23, a relay lens 24, a reflection mirror 25, a field lens 17B, the liquid crystal panel 18B, and a cross dichroic prism 19. The B light having passed through the second dichroic mirror 21 travels via the relay lens 22, the reflection mirror 23, the relay lens 24, the reflection mirror 25, and the field lens 17B and is incident on the liquid crystal panel 18B. The liquid crystal panel 18B is a light modulator. The liquid crystal panel 18B modulates the B light in accordance with an image signal to form a blue projection image.

The liquid crystal panels 18R, 18G, and 18B surround the cross dichroic prism 19 so as to face three sides of the cross dichroic prism 19. The cross dichroic prism 19 is a prism for light combination and produces a projection image that is the combination of the light modulated by the liquid crystal panel 18R, the light modulated by the liquid crystal panel 18G, and the light modulated by the liquid crystal panel 18B.

The projection system 3 magnifies the combined projection image from the cross dichroic prism. 19 and projects the magnified projection image onto the screen S.

The control unit 4 includes an image processor 6, to which an external image signal, such as a video signal, is inputted, and a display driver 7, which drives the liquid crystal panels 18R, 18G, and 18B based on image signals outputted from the image processor 6.

The image processor 6 converts the image signal inputted from an external apparatus into image signals each containing grayscales and other factors of a color corresponding to the image signal. The display driver 7 operates the liquid crystal panels 18R, 18G, and 18B based on the color image signals outputted from the image processor 6. The image processor 6 thus causes the liquid crystal panels 18R, 18G, and 18B to display projection images corresponding to the image signals.

Projection System

Figure 2:
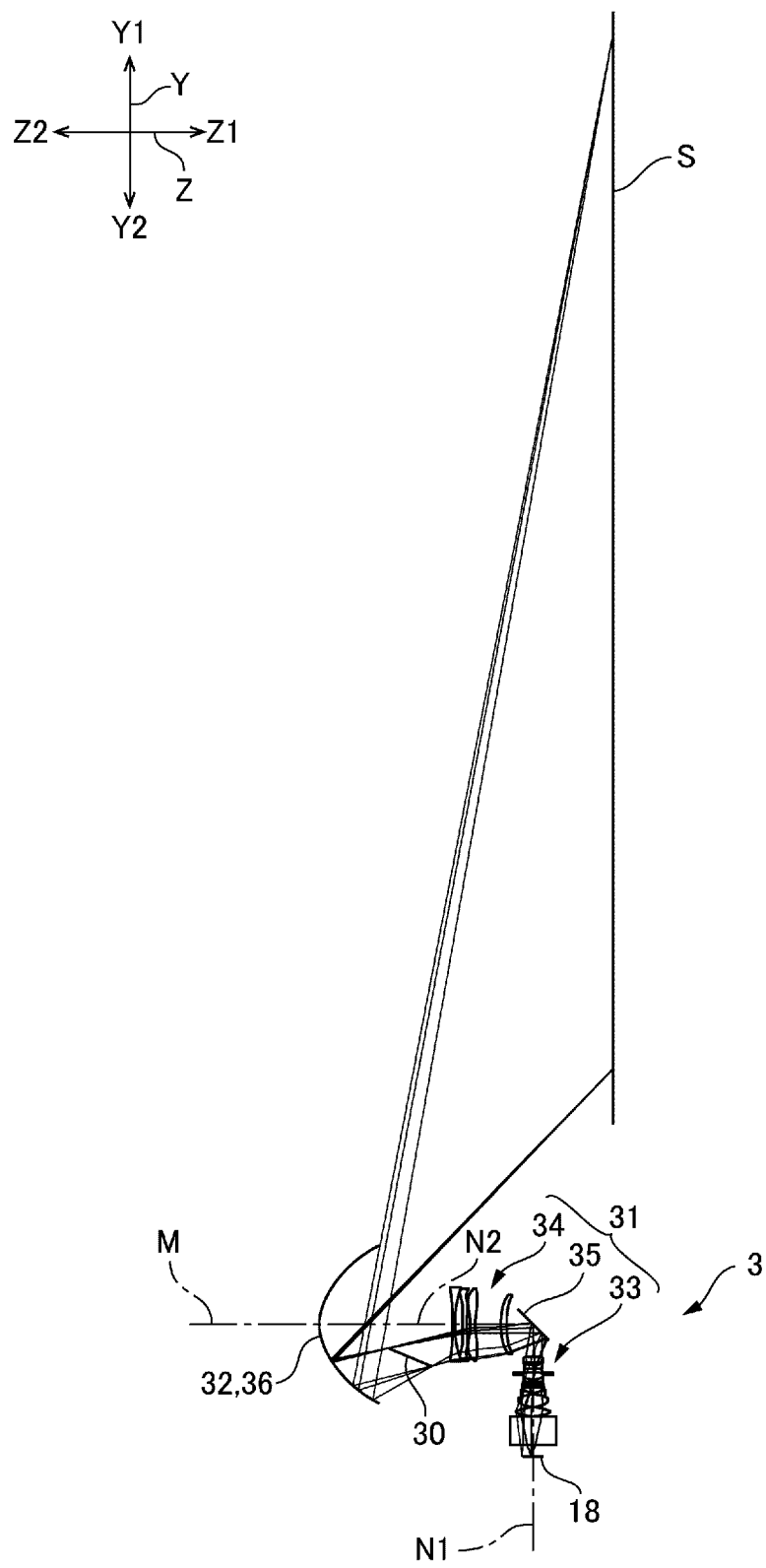
FIG. 2 is a beam diagram showing beams passing through the projection system.

The projection system 3 will next be described. FIG. 2 is a beam diagram showing beams passing through the projection system 3. In FIG. 2, the liquid crystal panels 18R, 18G, and 18B are drawn as a liquid crystal panel 18. The screen S is disposed in the enlargement-side conjugate plane of the projection system 3, as shown in FIG. 2. The liquid crystal panel 18 is disposed in the reduction-side conjugate plane of the projection system 3.

In the following description, three axes perpendicular to one another are called axes X, Y, and Z for convenience. The width direction of the screen S, which is the enlargement-side conjugate plane, is called an axis-X direction, the upward-downward direction of the screen S is called an axis-Y direction, and the direction perpendicular to the screen S is called an axis-Z direction. In the axis-Y direction, the direction toward the upper side of the screen S is called a direction Y1, and the direction toward the lower side of the screen S is called a direction Y2. In the axis-Z direction, the direction toward the side where the screen S is located is called a direction Z1, and the direction opposite to the direction Z1 is called a direction Z2.

The projection system 3 includes a first optical system 31 and a second optical system 32 located on the side facing the direction Z2 of the screen. The second optical system 32 is disposed on one side of the first optical system 31, the side facing the direction Z2. The first optical system 31 includes a first lens group 33, a second lens group 34 disposed on the enlargement side of the first lens group 33, and an optical path deflector 35 disposed between the first lens group 33 and the second lens group 34. The first lens group 33 has positive power, and the second lens group 34 has negative power. The optical path deflector 35 deflects the optical path of the projection system 3 by 90° between the first lens group 33 and the second lens group 34.

The first lens group 33 is a refractive optical system. A first optical axis N1 of the first lens group 33 extends along the axis-Y direction. Each lens of the first lens group 33 has a rotationally symmetric plane with respect to a first optical axis N1. The screen S is located in a position shifted in the direction Z1 from the first optical axis N1. The optical path deflector 35 is a flat mirror. The second lens group 34 is a refractive optical system. The second lens group 34 is located in a position shifted in the direction Z2 from the first optical axis N1. A second optical axis N2 of the second lens group 34 extends along the axis-Z direction. Each lens L of the second lens group 34 has a rotationally symmetric plane with respect to the second optical axis N2. The second lens group 34 includes 3 aspherical lenses. In the second lens group 34, a lens L (first lens) located in a position closest to the enlargement side is made of glass.

The second optical system 32 is formed of a concave mirror 36 (reflection member). The concave mirror 36 has a concave reflection surface. The reflection surface of the concave mirror 36 faces the direction Z1. A third optical axis M of the concave mirror 36 coincides with the second optical axis N2.

The reduction-side conjugate plane extending in the axis-Z direction and located in the first optical axis is perpendicular to the enlargement-side conjugate plane, as shown in FIG. 2. The liquid crystal panel 18 disposed in the reduction-side conjugate plane forms a projection image on the side shifted in the direction Z2 from the first optical axis N1. The light from the side facing the liquid crystal panel 18 passes through the first lens group 33, is then deflected by 90° by the optical path deflector 35, and travels in the direction Z2. The light traveling in the direction Z2 passes through the second lens group 34, is then deflected by the concave mirror 36 back in the directions Z1 and Y1, and reaches the screen S. The screen S is located in a position shifted in the direction Y1 from the second optical axis N2.

An intermediate image 30, which is conjugate with the reduction-side and enlargement-side conjugate planes, is formed between the first optical system 31 and the second optical system 32. The intermediate image 30 is formed in a position shifted in the direction Y2 from the second optical axis N2. The intermediate image 30 is an image conjugate with the magnified image but turned upside down.

Examples 1 to 4 will be described below as examples of the configuration of the projection system 3 incorporated in the projector 1.

Example 1

Figure 3:
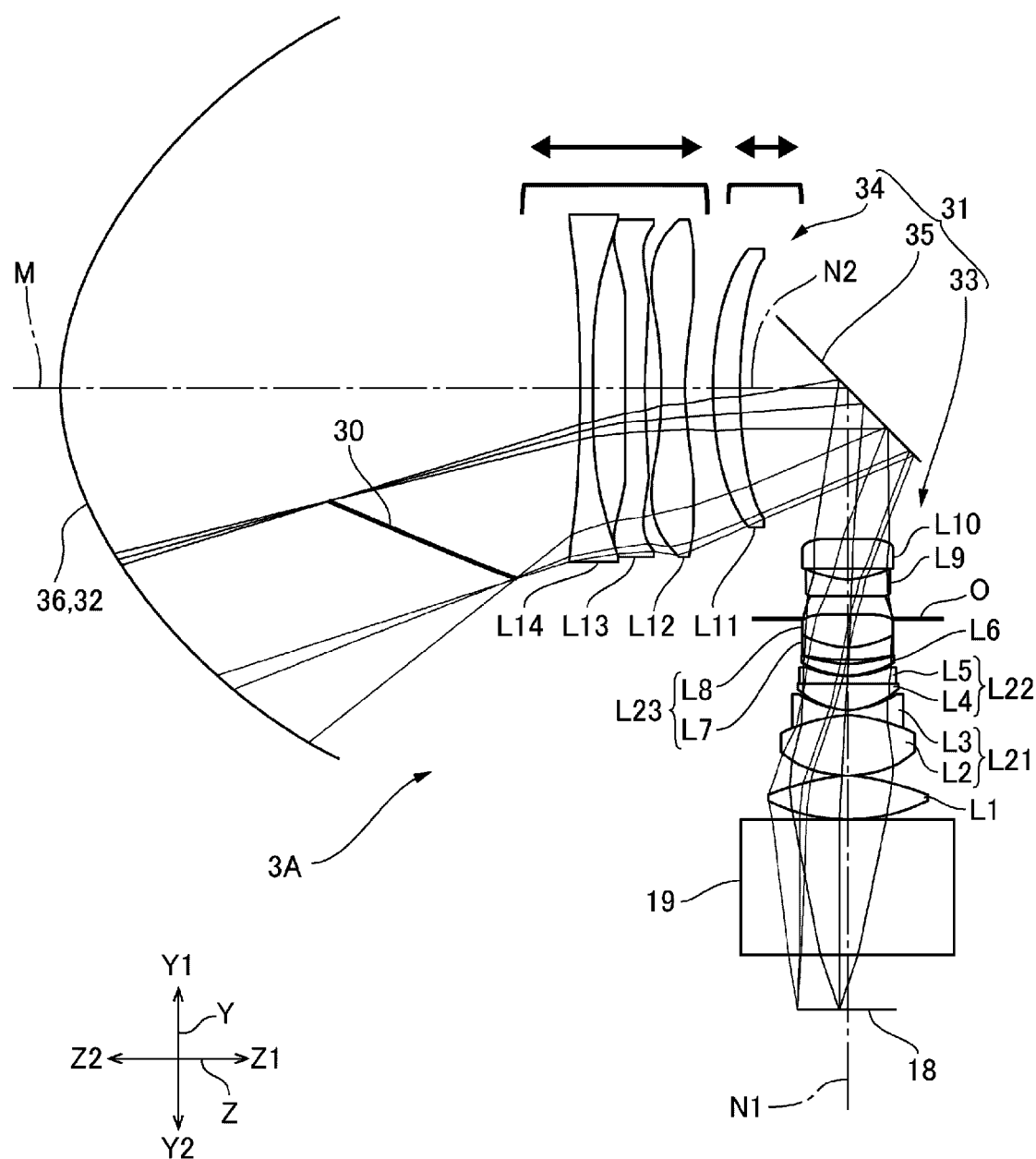
FIG. 3 is a beam diagram showing beams passing through the projection system according to Example 1.

FIG. 3 is a beam diagram showing beams passing through a projection system 3A according to Example 1. The projection system 3A includes the first optical system 31 and the second optical system 32 disposed on the enlargement side of the first optical system 31. The first optical system 31 includes the first lens group 33, the second lens group 34 disposed on the enlargement side of the first lens group 33, and the optical path deflector 35 disposed between the first lens group 33 and the second lens group 34.

The first lens group 33 has positive power. The first lens group 33 includes 10 lenses L1 to L10. The lenses L1 to L10 are arranged in the presented order from the reduction side toward the enlargement side. In the present example, the lenses L2 and L3 are bonded to each other into a first doublet L21. The lenses L4 and L5 are bonded to each other into a second doublet L22. The lenses L7 and L8 are bonded to each other into a third doublet L23. The aperture O is disposed between the lens L8 and the lens L9. The lenses L1 to L10 are made of glass. The lenses L1 and L6 are each an aspherical lens having aspherical shapes on opposite sides.

The second lens group 34 has negative power. The second lens group 34 includes 4 lenses L11 to L14. The lenses L11 to L14 are arranged in the presented order from the reduction side toward the enlargement side. In the present example, the lenses L11, L12, and L13 are each an aspherical lens having aspherical shapes on opposite sides. The lenses L11, L12, and L13 are made of resin. The lens L14 (first lens) is made of glass.

The optical path deflector 35 is a flat mirror having a flat reflection surface. In the present example, the optical path deflector 35 has no power. The optical path deflector 35 inclines by 45° with respect to the axes Y and Z.

The second optical system 32 includes the concave mirror 36 having a concave reflection surface. The reflection surface of the concave mirror 36 has an aspherical shape. The third optical axis M of the concave mirror 36 is a design optical axis. The concave mirror 36 is rotationally symmetric with respect to the third optical axis M. The light from the first optical system 31 is radiated onto a region of the reflection surface of the concave mirror 36, the region shifted in the direction Y2 from the third optical axis M. The concave mirror 36 reflects the light from the first optical system 31 in the directions Z1 and Y1 to cause the light to reach the screen S.

The intermediate image 30 is formed between the second lens group 34 and the concave mirror 36.

The projection system 3A can change the projection distance thereof. When the projection distance is changed, 4 lenses of the second lens group 34, the lenses L11 to L14, are moved along the second optical axis N2 for focusing. In the focusing, the lenses L12, L13, and L14 are moved as a unit.

Let F be the focal length of the entire projection system 3A, FNO be the F number of the projection system 3A, Ymax be the maximum image height of the liquid crystal panel 18 in the reduction-side conjugate plane, TTL be the optical path length from the liquid crystal panel 18 in the reduction-side conjugate plane to the reflection surface of the concave mirror 36 of the second optical system 32, Dg1 be the length of the first lens group 33, Fm be the focal length of the reflection surface of the concave mirror 36 of the second optical system 32, FL1 be the focal length of the lens L14 disposed in a position closest to the enlargement side in the second lens group 34, and RL1S2 be the radius of curvature of the reduction-side surface of the lens L14 disposed in the position closest to the enlargement side in the second lens group 34, and data on the projection system 3A according to Example 1 are listed below. The optical path length TTL is the sum of the optical path length along the first optical axis N1 from the liquid crystal panel 18 in the reduction-side conjugate plane to the reflection surface of the optical path deflector 35 and the optical path length along the second optical axis N2 from the reflection surface of the optical path deflector 35 to the reflection surface of the concave mirror 36. The length Dg1 is the length along the first optical axis N1 from the reduction-side surface of the lens L1 to the enlargement-side surface of the lens L10.

|F| 2.070 mm
FNO 1.8
Ymax 11.80 mm
TTL 285.63 mm
Dg1 65.24 mm
Fm 30.02 mm
FL1 −111.47 mm
RL1S2 121.76 mm Lens data of the projection system 3A are as follows. The surfaces of the lenses are numbered sequentially from the reduction side toward the enlargement side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number. Reference characters R and D are expressed in millimeters. A variable spacing 1 is the distance between the lenses L10 and L11. A variable spacing 2 is the distance between the lenses L11 and L12. A variable spacing 3 is the distance between the lens L14 and the concave mirror 36. A variable spacing 4 is the distance between the concave mirror 36 and the screen S, that is, the projection distance.

| Reference character | Surface number | R | D | nd | vd |
|---|---|---|---|---|---|
| 18 | 0 | infinity | 12.550 | | |
| 19 | 1 | infinity | 31.060 | 1.51630 | 64.10 |
| | 2 | infinity | 0.000 | | |
| L1 | 3* | 58.49 | 10.072 | 1.55330 | 71.68 |
| | 4* | −29.84 | 0.100 | | |
| L2 | 5 | 24.86 | 13.836 | 1.49700 | 81.61 |
| L3 | 6 | −33.43 | 1.500 | 1.90366 | 31.32 |
| | 7 | 19.99 | 0.100 | | |
| L4 | 8 | 16.41 | 6.253 | 1.49700 | 81.61 |
| L5 | 9 | 4597.35 | 1.686 | 1.92286 | 20.88 |
| | 10 | 31.27 | 0.205 | | |
| L6 | 11* | 26.18 | 2.757 | 1.69304 | 52.93 |
| | 12* | 57.32 | 0.799 | | |
| L7 | 13 | 45.81 | 3.000 | 1.90270 | 31.01 |
| L8 | 14 | 24.79 | 7.615 | 1.86966 | 20.02 |
| | 15 | −45.66 | −1.130 | | |
| O | 16 | infinity | 5.132 | | |
| L9 | 17 | 195.80 | 3.998 | 1.77250 | 49.62 |
| | 18 | 23.01 | 2.357 | | |
| L10 | 19 | −3098.68 | 6.954 | 1.59270 | 35.45 |
| | 20 | −40.60 | Variable spacing 1 | | |
| | 21 | infinity | −25.000 | | |
| 35 | 22 | infinity | 0.000 | Reflection surface | |
| | 23 | infinity | −25.000 | | |
| L11 | 24* | 495.78 | −6.195 | 1.53113 | 55.75 |
| | 25* | 205.29 | Variable spacing 2 | | |
| L12 | 26* | 52.08 | −5.459 | 1.53113 | 55.75 |
| | 27* | −79.72 | −3.567 | | |

-continued

| Reference character | Surface number | R | D | nd | vd |
|---|---|---|---|---|---|
| L13 | 28* | −830.74 | −4.690 | 1.53113 | 55.75 |
| | 29* | −493.23 | −8.303 | | |
| L14 | 30 | 121.76 | −3.000 | 1.79999 | 29.84 |
| | 31 | −346.02 | Variable spacing 3 | | |
| 36 | 32* | 60.04 | Variable spacing 4 | Reflection surface | |
| S | 33 | infinity | 0.000 | | |

The projection system 3A according to the present example can change the projection distance thereof to the one selected from a standard distance, a short distance shorter than the standard distance, and a long distance longer than the standard distance. When the projection distance is the standard distance, the variable spacing 4 is 342.29 mm. When the projection distance is the short distance, the variable spacing 4 is 275.00 mm. When the projection distance is the long distance, the variable spacing 4 is 442.61 mm. When the projection distance is changed from the standard distance to another, the lens L11 of the second lens group 34 is moved for focusing. The variable spacing 1 thus changes. When the projection distance is changed, the lenses L12, L13, and L14 of the second lens group 34 are further moved as a unit for focusing. The variable spacings 2 and 3 thus change. The relationship among the variable spacings 1, 2, 3, and 4 is as follows:

| | D | | |
|---|---|---|---|
| | Short distance | Standard distance | Long distance |
| Variable spacing 1 | 46.28 | 52.86 | 59.99 |
| Variable spacing 2 | −18.98 | −13.31 | −6.99 |
| Variable spacing 3 | −123.92 | −123.01 | −122.20 |
| Variable spacing 4 | 275.00 | 342.29 | 442.61 |

The aspherical coefficients are listed below.

| | Surface number | | | |
|---|---|---|---|---|
| | 3 | 4 | 11 | 12 |
| Conic constant (K) | 0.00000E+00 | 0.00000E+00 | 1.80123E+00 | 0.00000E+00 |
| Fourth coefficient (A) | 1.31295E−05 | 2.06200E−05 | 3.82315E−05 | 5.34073E−05 |
| Sixth coefficient (B) | −1.04798E−08 | 1.35785E−08 | −3.41529E−07 | −1.86081E−07 |
| Eighth coefficient (C) | 3.43862E−11 | −2.71281E−10 | 4.58156E−09 | 8.44515E−09 |
| Tenth coefficient (B) | 1.22009E−13 | 2.93923E−12 | −9.49302E−11 | −2.24707E−10 |
| Twelfth coefficient (B) | −1.68883E−15 | −1.82216E−14 | 1.50396E−12 | 4.18426E−12 |
| Fourteenth coefficient (B) | 6.85720E−18 | 6.83178E−17 | −1.41019E−14 | −4.82521E−14 |
| Sixteenth coefficient (B) | −1.13908E−20 | −1.51871E−19 | 7.57380E−17 | 3.44650E−16 |
| Eighteenth coefficient (B) | 3.25556E−24 | 1.82083E−22 | −2.10422E−19 | −1.41155E−18 |
| Twentieth coefficient (B) | 6.41800E−27 | −8.99391E−26 | 2.62837E−22 | 2.64923E−21 |

| | Surface number | | | |
|---|---|---|---|---|
| | 24 | 25 | 26 | 27 |
| Conic constant (K) | 0.00000E+00 | 0.00000E+00 | 0.00000E+00 | 0.00000E+00 |
| Fourth coefficient (A) | 1.59319E−05 | 1.61442E−05 | −3.64853E−05 | 1.40866E−05 |
| Sixth coefficient (B) | 6.35804E−09 | 2.55922E−08 | 1.29127E−07 | −9.47030E−08 |
| Eighth coefficient (C) | −2.90244E−10 | −3.18101E−10 | −2.91035E−10 | 3.60727E−10 |
| Tenth coefficient (B) | 1.15222E−12 | 9.72244E−13 | 3.74826E−13 | −7.78206E−13 |
| Twelfth coefficient (B) | −2.37192E−15 | −1.62914E−15 | −2.62556E−16 | 1.06725E−15 |
| Fourteenth coefficient (B) | 2.95223E−18 | 1.68315E−18 | 6.64277E−20 | −9.37353E−19 |

-continued

| | | | |
|---|---|---|---|
| Sixteenth coefficient (B) | −2.23261E−21 | −1.06917E−21 | 3.20684E−23 | 5.08126E−22 |
| Eighteenth coefficient (B) | 9.46012E−25 | 3.83709E−25 | −2.62999E−26 | −1.54584E−25 |
| Twentieth coefficient (B) | −1.71942E−28 | −5.95007E−29 | 5.24341E−30 | 2.01880E−29 |

| | Surface number | | |
|---|---|---|---|
| | 28 | 29 | 32 |
| Conic constant (K) | 0.00000E+00 | 0.00000E+00 | −9.64609E−01 |
| Fourth coefficient (A) | 2.65752E−05 | −2.06308E−06 | 7.93484E−08 |
| Sixth coefficient (B) | −9.62917E−08 | 1.39861E−08 | −2.73356E−10 |
| Eighth coefficient (C) | 1.49945E−10 | 2.72118E−11 | 1.88194E−13 |
| Tenth coefficient (B) | −1.31916E−13 | −2.39131E−13 | −6.96689E−17 |
| Twelfth coefficient (B) | 5.50909E−17 | 4.66966E−16 | 1.61579E−20 |
| Fourteenth coefficient (B) | 1.49823E−20 | −4.40842E−19 | −2.39261E−24 |
| Sixteenth coefficient (B) | −2.77978E−23 | 2.27226E−22 | 2.20895E−28 |
| Eighteenth coefficient (B) | 1.07469E−26 | −6.19308E−26 | −1.16225E−32 |
| Twentieth coefficient (B) | −1.26290E−30 | 7.03858E−30 | 2.67335E−37 |

Effects and Advantages

The projection system 3A according to the present example includes the first optical system 31 and the second optical system 32 disposed on the enlargement side of the first optical system 31. The first optical system 31 includes the first lens group 33, which has positive power, the second lens group 34 disposed on the enlargement side of the first lens group 33, and the optical path deflector 35 disposed between the first lens group 33 and the second lens group 34. The second optical system 32 includes the concave mirror 36 having the concave reflection surface. The second lens group 34 has negative power. The second lens group 34 includes three aspherical lenses. Conditional Expression (1) below is satisfied:

$$0.25 < |F| \times FNO/Y\text{max} < 0.5 \quad (1)$$

where F represents the focal length of the entire projection system 3A, FNO represents the F number of the projection system 3A, and Ymax represents the maximum image height in the reduction-side conjugate plane.

In the projection system 3A according to the present example, the first optical system 31 includes the optical path deflector 35 between the first lens group 33 and the second lens group 34. The first optical system 31 can therefore be bent between the first lens group 33 and the second lens group 34. The reduction-side conjugate plane can therefore be provided in a position closer to the second optical system 32 than in a case where the lenses of the first lens group 33 and the lenses of the second lens group 34 of the first optical system 31 are arranged along a linearly extending optical axis. Therefore, when the projector 1 including the projection system 3A according to the present example projects a projection image onto the screen S, the situation in which the liquid crystal panel 18, which forms the projection image in the reduction-side conjugate plane, is located behind the screen S can be avoided. Therefore, for example, even when the screen S is installed along a wall surface extending vertically from the floor surface, the projector 1 can perform projection onto the thus installed screen S.

In the projection system 3A according to the present example, the second lens group 34 includes three aspherical lenses. Occurrence of aberrations in the enlargement-side conjugate plane can therefore be suppressed.

Furthermore, since the projection system 3A according to the present example satisfies Conditional Expression (1), an increase in the size of the projection system 3A can be suppressed. Moreover, the projection system 3A according to the present example, which satisfies Conditional Expression (1), can form a bright magnified image in the enlargement-side conjugate plane while suppressing occurrence of the aberrations.

That is, in the present example,

|F| 2.070 mm

FNO 1.8

Ymax 11.80 mm are satisfied. Therefore, $|F| \times FNO/Y\text{max} = 0.316$ is achieved.

When $|F| \times FNO/Y\text{max}$ in Conditional Expression (1) is smaller than the lower limit, the magnified image becomes brighter, but it is difficult to correct the aberrations in a satisfactory manner. When $|F| \times FNO/Y\text{max}$ in Conditional Expression (1) is greater than the upper limit, the aberrations can be corrected in a satisfactory manner, but the magnified image becomes darker, and the size of the projection system increases.

In the present example, the first optical system 31 includes the optical path deflector 35 between the first lens group 33 and the second lens group 34, and the optical path deflector 35 allows the first optical system 31 to be bent between the first lens group 33 and the second lens group 34. The optical path deflector 35 allows flexible arrangement of the first lens group 33 and the second lens group 34 in the first optical system 31. Therefore, when the beam passing through the first optical system 31 from the side facing the reduction-side conjugate plane is deflected back by the concave mirror 36 of the second optical system 32, the interference of the deflected beam with any of the lenses of the second lens group 34 can be avoided. There is therefore no need to provide the lenses of the second lens group 34 with notches to avoid interference with the beam deflected back by the concave mirror 36. Therefore, in the present example, the lenses of the second lens group 34 can each have a rotationally symmetric plane with reference to the second optical axis N2 of the second lens group 34. When the lenses of the second lens group 34 each have a rotationally symmetric plane with reference to the second optical axis N2, the lenses of the second lens group 34 can be readily manufactured. Furthermore, the lenses of the second lens group 34 are precisely positioned.

In the present example, Conditional Expression (2) below is satisfied, $$0.15 < Dg1/TTL < 0.30 \quad (2)$$

where TTL represents the optical path length from the liquid crystal panel 18 in the reduction-side conjugate plane to the reflection surface of the concave mirror 36, and Dg1 represents the length of the first lens group 33.

That is, in the present example,

TTL 285.63 mm

Dg1 65.24 mm are satisfied. Therefore, Dg1/TTL=0.23 is achieved.

Since the projection system 3A satisfies Conditional Expression (2), the aberrations of the magnified image can be suppressed with an increase in the size of the projection system 3A suppressed. That is, when Dg1/TTL in Conditional Expression (2) is smaller than the lower limit, the size of the projection system 3A can be reduced, but lenses necessary for correction of the aberrations of the magnified image cannot be adequately disposed in the projection system 3A. As a result, it is difficult to suppress the aberrations of the magnified image. When Dg1/TTL in Conditional Expression (2) is greater than the upper limit, the lenses necessary for correction of the aberrations of the magnified image can be adequately disposed in the projection system 3A, so that the aberrations of the magnified image can be corrected in a satisfactory manner, but the size of the projection system 3A increases. The length of the first lens group 33 is the on-axis distance from the reduction-side lens surface of the lens located in a position closest to the reduction side to the enlargement-side lens surface of the lens located in a position closest to the enlargement side among the lenses that form the first lens group 33.

In the present example, the first lens group 33 includes an aspherical lens. The aberrations can therefore be more readily corrected.

In the projection system 3A according to the present example, the intermediate image 30, which is conjugate with the reduction-side and enlargement-side conjugate planes, is formed between the first optical system 31 and the second optical system 32. The projection system 3A therefore includes three aspherical lenses in the second lens group 34 close to the intermediate image 30. Occurrence of aberrations at the intermediate image 30 can thus be suppressed, whereby occurrence of the aberrations in the enlargement-side conjugate plane is readily suppressed.

In the present example, the lens L14 disposed in the position closest to the enlargement side in the second lens group 34 is made of glass. Therefore, chromatic aberrations are therefore readily corrected as compared with a case where the lens L14 is made of resin.

Furthermore, in the present example, the reflection surface of the concave mirror 36 is an aspherical surface, and Conditional Expression (3) below is satisfied, $$10<Fm/|F| \tag{3}$$

where Fm represents the focal length of the reflection surface of the concave mirror 36.

That is, in the present example,

|F| 2.070 mm

Fm 30.02 mm are satisfied. Therefore, Fm/|F|=14.51 is achieved.

Since the projection system 3A according to the present example satisfies Conditional Expression (3), the reflection surface of the concave mirror 36, which has the function of enlargement and projecting the intermediate image 30, has refractive power in an appropriate range. That is, when Fm/|F| in Conditional Expression (3) is smaller than the lower limit, the projection distance can be shortened, but the amount of aberrations that occur at the reflection surface of the concave mirror 36 increases, making it difficult to produce a satisfactory magnified image.

In the present example, Conditional Expression (4) below is satisfied, $$-120<FL1/|F|<-30 \tag{4}$$

where FL1 represents the focal length of the lens L14, which is located in a position closest to the enlargement side in the second lens group 34.

That is, in the present example,

|F| 2.070 mm

FL1 −111.47 mm are satisfied. Therefore, FL1/|F|=−53.86 is achieved.

Since the projection system 3A in the present example satisfies Conditional Expression (4), occurrence of the aberrations of the intermediate image 30, which is located on the enlargement side of the lens L14, can be suppressed with an increase in the size of the entire projection system 3A suppressed. That is, when FL1/|F| in Conditional Expression (4) is smaller than the lower limit, the power of lens L14 becomes too large to correct the aberrations at the intermediate image 30. When FL1/|F| in Conditional Expression (4) is greater than the upper limit, the power of the lens 14 becomes too small. As a result, the power of the lens L11 to L13 of the second lens group 34 increases, so that the aberrations are likely to occur.

In the present example, Conditional Expression (5) below is satisfied, $$30<RL1S2/|F|<100 \tag{5}$$

where RL1S2 represents the radius of curvature of the reduction-side lens surface of the lens L14, which is located in a position closest to the enlargement side in the second lens group 34.

That is, in the present example,

|F| 2.070 mm

RL1S2 121.76 mm are satisfied. Therefore, RL1S2/|F|=−58.83 is achieved.

Since the projection system 3A according to the present example satisfies Conditional Expression (5), a well-corrected magnified image can be produced with the intermediate image 30 formed in an appropriate position. That is, when RL1S2/|F| in Conditional Expression (5) is smaller than the lower limit, the intermediate image 30 is too close to the second lens group 34. When RL1S2/|F| in Conditional Expression (5) is greater than the upper limit, the intermediate image 30 is too close to the concave mirror 36. In the cases described above, dust or dirt having adhered to the lens L14 or the concave mirror 36 may form an image in the enlargement-side conjugate plane, but such a situation can be avoided because Conditional Expression (5) is satisfied.

Figure 4:
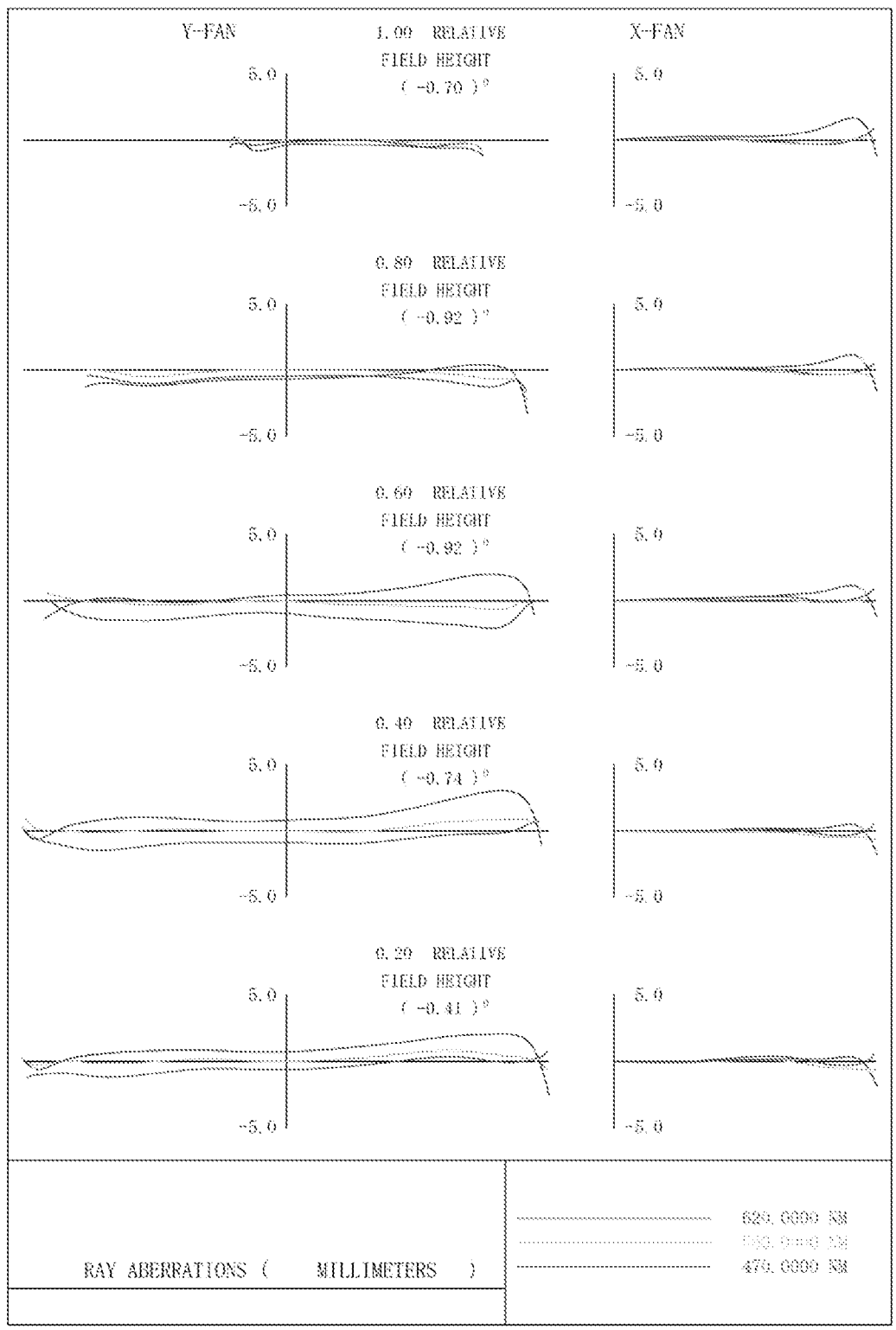
FIG. 4 shows lateral aberrations of an image magnified by the projection system in the case of a standard distance.
Figure 5:
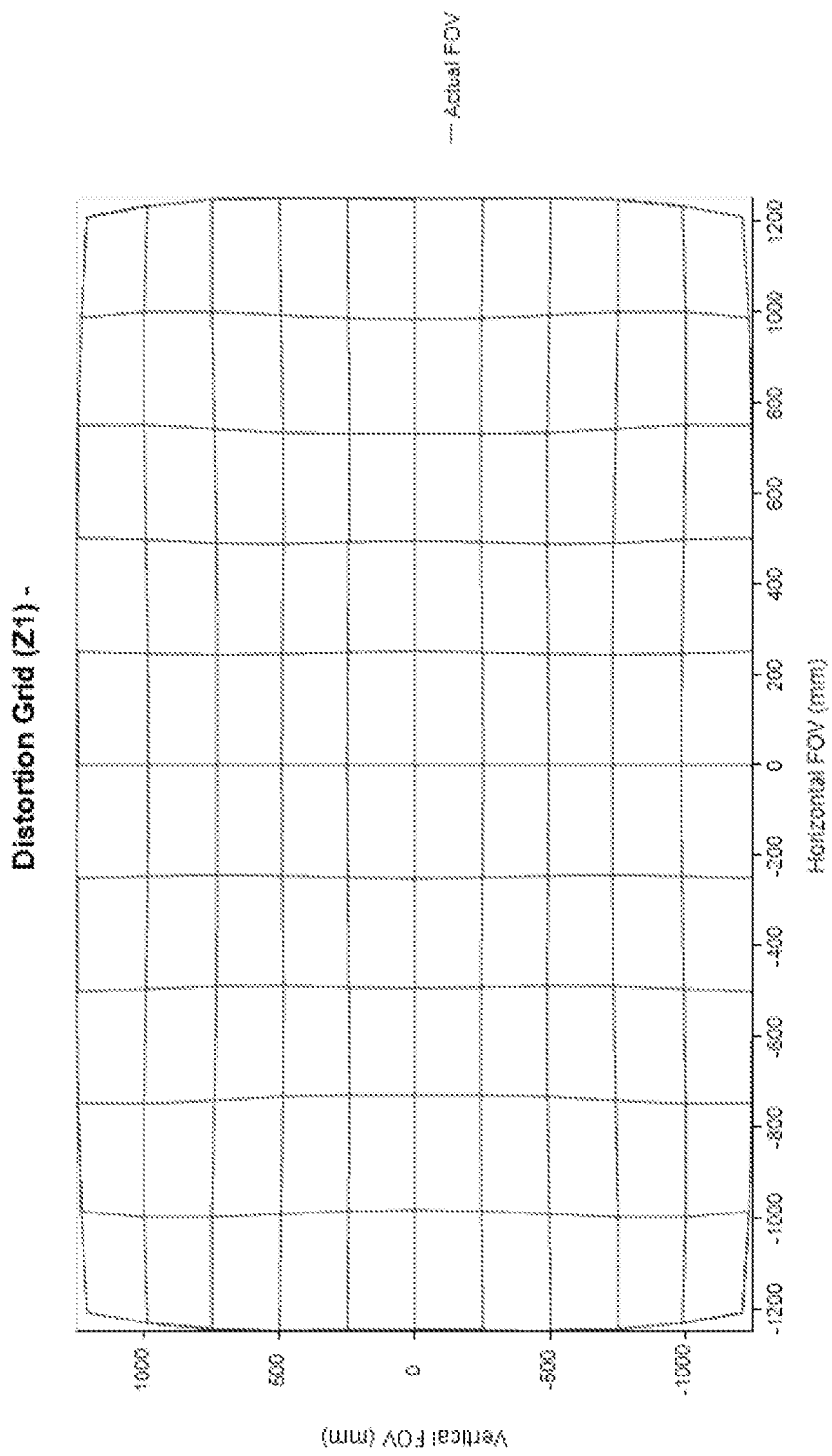
FIG. 5 shows grid distortion of the image magnified by the projection system in the case of the standard distance.

FIG. 4 shows lateral aberrations of the image magnified by the projection system 3A when the variable spacing 4 is the standard distance. FIG. 5 shows grid distortion of the image magnified by the projection system 3A when the variable spacing 4 is the standard distance. The projection system 3A according to the present example produces a magnified image with suppressed lateral aberrations and grid distortion, as shown in FIGS. 4 and 5.

Example 2

Figure 6:
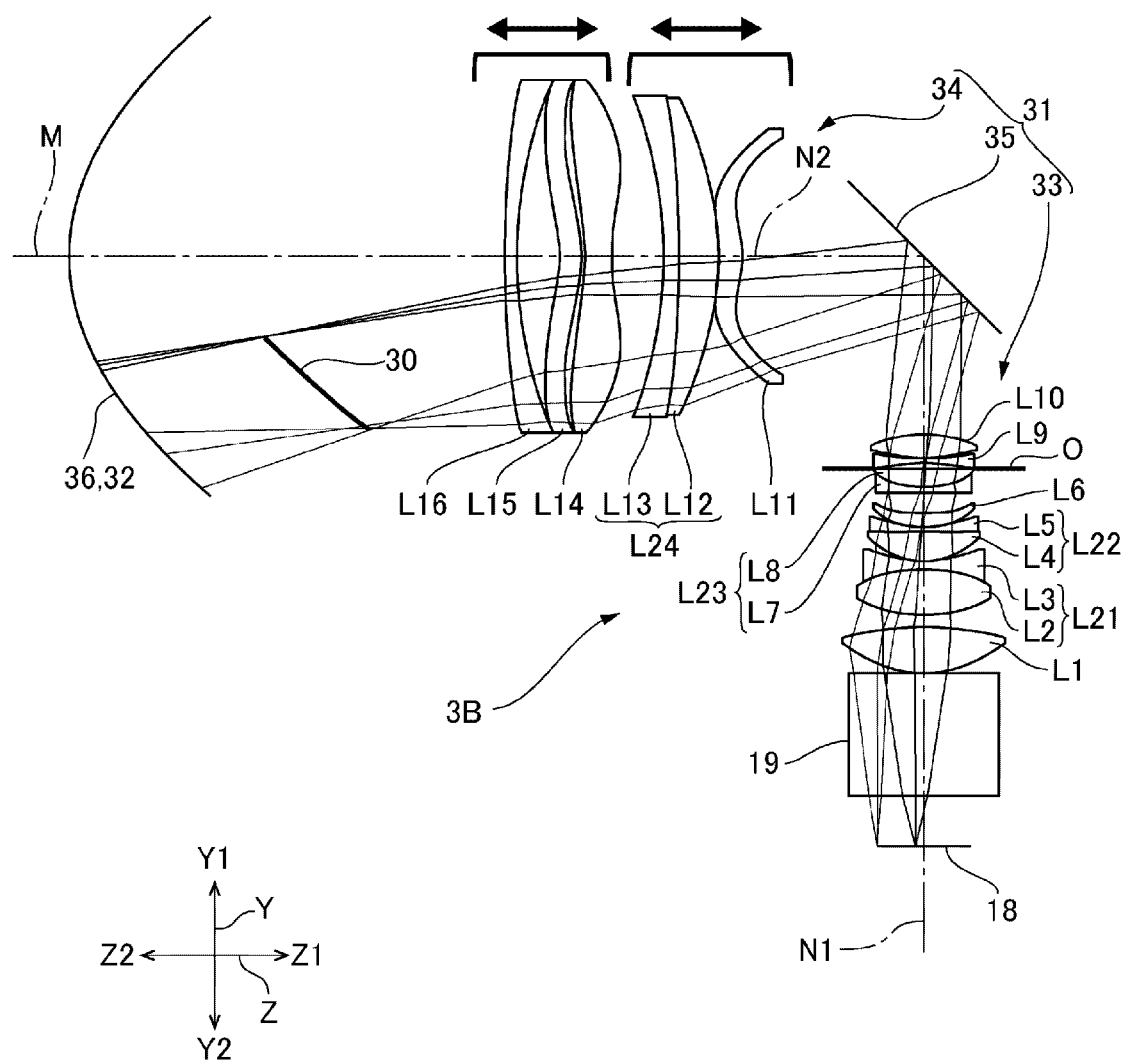
FIG. 6 is a beam diagram showing beams passing through the projection system according to Example 2.

FIG. 6 is a beam diagram showing beams passing through a projection system 3B according to Example 2. The projection system 3B includes the first optical system 31 and the second optical system 32 disposed on the enlargement side of the first optical system 31. The first optical system 31 includes the first lens group 33, the second lens group 34 disposed on the enlargement side of the first lens group 33, and the optical path deflector 35 disposed between the first lens group 33 and the second lens group 34.

The first lens group 33 has positive power. The first lens group 33 includes 10 lenses L1 to L10. The lenses L1 to L10 are arranged in the presented order from the reduction side toward the enlargement side. In the present example, the lenses L2 and L3 are bonded to each other into the first doublet L21. The lenses L4 and L5 are bonded to each other into the second doublet L22. The lenses L7 and L8 are bonded to each other into the third doublet L23. The aperture O is disposed between the lens L8 and the lens L9. The lenses L1 to L10 are made of glass. The lenses L1 and L6 are each an aspherical lens having aspherical shapes on opposite sides.

The second lens group 34 has negative power. The second lens group 34 includes 6 lenses L11 to L16. The lenses L11 to L16 are arranged in the presented order from the reduction side toward the enlargement side. In the present example, the lenses L12 and L13 are bonded to each other into a fourth doublet L24. The lenses L11, L14, and L15 are each an aspherical lens having aspherical shapes on opposite sides. The lenses L11, L14, and L15 are made of resin. The lenses L12, L13, and L16 (first lens) are made of glass.

The optical path deflector 35 is a flat mirror having a flat reflection surface. In the present example, the optical path deflector 35 has no power. The optical path deflector 35 inclines by 45° with respect to the axes Y and Z.

The second optical system 32 includes the concave mirror 36 having a concave reflection surface. The reflection surface of the concave mirror 36 has an aspherical shape. The third optical axis M of the concave mirror 36 is a design optical axis. The concave mirror 36 is rotationally symmetric with respect to the third optical axis M. The light from the first optical system 31 is radiated onto a region of the reflection surface of the concave mirror 36, the region shifted in the direction Y2 from the third optical axis M. The concave mirror 36 reflects the light from the first optical system 31 in the directions Z1 and Y2 to cause the light to reach the screen S.

The intermediate image 30 is formed between the second lens group 34 and the concave mirror 36.

The projection system 3B can change the projection distance thereof. When the projection distance is changed, 6 lenses of the second lens group 34, the lenses L11 to L16, are moved along the second optical axis N2 for focusing. In the focusing, the lenses L11, L12, and L13 are moved as a unit, and the lenses L14, L15, and L16 are moved as a unit.

Under the definition that F represents the focal length of the entire projection system 3B, FNO represents the F number of the projection system 3B, Ymax represents the maximum image height of the liquid crystal panel 18 in the reduction-side conjugate plane, TTL represents the optical path length from the liquid crystal panel 18 in the reduction-side conjugate plane to the reflection surface of the concave mirror 36 of the second optical system 32, Dg1 represents the length of the first lens group 33, Fm represents the focal length of the reflection surface of the concave mirror 36 of the second optical system 32, FL1 represents the focal length of the lens L16 disposed in the position closest to the enlargement side in the second lens group 34, and RL1S2 represents the radius of curvature of the reduction-side surface of the lens L16 disposed in the position closest to the enlargement side in the second lens group 34, data on the projection system 3B according to Example 2 are listed below. The optical path length TTL is the sum of the optical path length along the first optical axis N1 from the liquid crystal panel 18 in the reduction-side conjugate plane to the reflection surface of the optical path deflector 35 and the optical path length along the second optical axis N2 from the reflection surface of the optical path deflector 35 to the reflection surface of the concave mirror 36. The length Dg1 is the length along the first optical axis N1 from the reduction-side surface of the lens L1 to the enlargement-side surface of the lens L10.

|F| 2.506 mm
FNO 2.2
Ymax 11.80 mm
TTL 336.96 mm
Dg1 60.13 mm
Fm 25.72 mm
FL1 −251.73 mm
RL1S2 113.25 mm Data on the lenses of the projection system 3B are listed below. The surfaces of the lenses are numbered sequentially from the reduction side toward the enlargement side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number. Reference characters R and D are expressed in millimeters. The variable spacing 1 is the distance between the lenses L10 and L11. The variable spacing 2 is the distance between the lenses L13 and L14. The variable spacing 3 is the distance between the lens L16 and the concave mirror 36. The variable spacing 4 is the distance between the concave mirror 36 and the screen S, that is, the projection distance.

| Reference character | Surface number | R | D | nd | vd |
|---|---|---|---|---|---|
| 18 | 0 | infinity | 12.550 | | |
| 19 | 1 | infinity | 31.060 | 1.51630 | 64.10 |
| | 2 | infinity | 0.000 | | |
| L1 | 3* | 30.47 | 11.461 | 1.55330 | 71.68 |
| | 4* | −55.16 | 3.096 | | |
| L2 | 5 | 35.82 | 11.483 | 1.49700 | 81.61 |
| L3 | 6 | −36.24 | 2.000 | 1.90366 | 31.32 |
| | 7 | 30.13 | 0.200 | | |
| L4 | 8 | 19.10 | 6.817 | 1.49700 | 81.61 |
| L5 | 9 | 124.25 | 1.592 | 1.92286 | 20.88 |
| | 10 | 32.09 | 0.200 | | |
| L6 | 11* | 28.78 | 3.399 | 1.67790 | 55.34 |
| | 12* | 100.78 | 4.706 | | |
| L7 | 13 | 1081.87 | 2.081 | 1.90270 | 31.01 |
| L8 | 14 | 26.54 | 4.514 | 1.86966 | 20.02 |
| | 15 | −204.74 | −0.118 | | |
| O | 16 | infinity | 1.195 | | |
| L9 | 17 | −67.05 | 1.502 | 1.77250 | 49.60 |
| | 18 | 68.58 | 0.226 | | |
| L10 | 19 | 63.90 | 5.775 | 1.63980 | 34.47 |
| | 20 | −29.94 | Variable spacing 1 | | |
| | 21 | infinity | −45.000 | | |
| 35 | 22 | infinity | 0.000 | Reflection surface | |
| | 23 | infinity | 0.000 | | |
| | 24 | infinity | −45.000 | | |
| L11 | 25* | −38.74 | −5.776 | 1.53113 | 55.75 |
| | 26* | −43.28 | −0.500 | | |
| L12 | 27 | −90.00 | −9.436 | 1.51633 | 64.14 |
| L13 | 28 | −240.98 | −4.001 | 1.71736 | 29.52 |
| | 29 | −110.93 | Variable spacing 2 | | |

-continued

| Reference character | Surface number | R | D | nd | vd |
|---|---|---|---|---|---|
| L14 | 30* | 103.05 | −6.916 | 1.53113 | 55.75 |
|  | 31* | −69.36 | −1.063 |  |  |
| L15 | 32* | −60.24 | −5.271 | 1.53113 | 55.75 |
|  | 33* | −54.54 | −10.716 |  |  |
| L16 | 34 | 113.25 | −3.342 | 1.84666 | 23.78 |
|  | 35 | 242.53 | Variable spacing 3 |  |  |
| 36 | 36* | 51.44 | Variable spacing 4 | Reflection surface |  |
| S | 37 | infinity | 0.000 |  |  |

The projection system 3B according to the present example can change the projection distance thereof to the one selected from the standard distance, the short distance shorter than the standard distance, and the long distance longer than the standard distance. When the projection distance is the standard distance, the variable spacing 4 is 425.30 mm. When the projection distance is the short distance, the variable spacing 4 is 327.53 mm. When the projection distance is the long distance, the variable spacing 4 is 503.56 mm. When the projection distance is changed from the standard distance to another, the lenses L11, L12, and L13 of the second lens group 34 are moved as a unit for focusing. The variable spacing 1 thus changes. When the projection distance is changed, the lenses L14, L15, and L16 of the second lens group 34 are further moved as a unit for focusing. The variable spacings 2 and 3 thus change. The relationship among the variable spacings 1, 2, 3, and 4 is as follows:

|  | D | | |
|---|---|---|---|
|  | Short distance | Standard distance | Long distance |
| Variable spacing 1 | 89.04 | 90.17 | 90.74 |
| Variable spacing 2 | −14.00 | −13.43 | −13.15 |
| Variable spacing 3 | −110.33 | −109.77 | −109.48 |
| Variable spacing 4 | 327.53 | 425.30 | 503.56 |

The aspherical coefficients are listed below.

|  | Surface number | | | |
|---|---|---|---|---|
|  | 3 | 4 | 11 | 12 |
| Conic constant (K) | 0.00000E+00 | 0.00000E+00 | 2.94817E+00 | 0.00000E+00 |
| Fourth coefficient (A) | −1.08943E−06 | 1.09536E−05 | 2.13038E−05 | 5.27459E−05 |
| Sixth coefficient (B) | −4.49987E−09 | −2.54022E−09 | 7.76054E−08 | 4.10977E−07 |
| Eighth coefficient (C) | 5.41792E−11 | −7.64183E−11 | −3.24219E−09 | −1.06192E−08 |
| Tenth coefficient (B) | −4.12492E−13 | 8.54061E−13 | 8.98774E−11 | 2.86647E−10 |
| Twelfth coefficient (B) | 1.98549E−15 | −5.69531E−15 | −1.33828E−12 | −4.41922E−12 |
| Fourteenth coefficient (B) | −7.08415E−18 | 2.22300E−17 | 1.24826E−14 | 4.29846E−14 |
| Sixteenth coefficient (B) | 1.83292E−20 | −4.93143E−20 | −6.98959E−17 | −2.51541E−16 |
| Eighteenth coefficient (B) | −2.86725E−23 | 5.72512E−23 | 2.16117E−19 | 8.11255E−19 |
| Twentieth coefficient (B) | 1.94795E−26 | −2.65318E−26 | −2.78936E−22 | −1.07437E−21 |

|  | Surface number | | | |
|---|---|---|---|---|
|  | 25 | 26 | 30 | 31 |
| Conic constant (K) | 0.00000E+00 | 0.00000E+00 | 0.00000E+00 | 0.00000E+00 |
| Fourth coefficient (A) | 3.25712E−05 | 4.48800E−05 | 2.77723E−05 | 2.98379E−05 |
| Sixth coefficient (B) | 1.42876E−08 | −2.46500E−08 | −1.15403E−07 | −1.30100E−07 |
| Eighth coefficient (C) | −3.75461E−11 | 4.45040E−11 | 1.90326E−10 | 3.09543E−10 |
| Tenth coefficient (B) | 1.16833E−13 | −1.93936E−13 | −1.92972E−13 | −4.43897E−13 |
| Twelfth coefficient (B) | −3.18924E−16 | 5.26241E−16 | 1.31552E−16 | 4.11260E−16 |
| Fourteenth coefficient (B) | 5.29684E−19 | −8.25614E−19 | −6.06802E−20 | −2.47454E−19 |
| Sixteenth coefficient (B) | −6.02434E−22 | 7.02522E−22 | 1.80611E−23 | 9.27901E−23 |
| Eighteenth coefficient (B) | 4.14099E−25 | −2.95125E−25 | −3.10002E−27 | −1.95680E−26 |
| Twentieth coefficient (B) | −1.17761E−28 | 4.70323E−29 | 2.31080E−31 | 1.76337E−30 |

|  | Surface number | | |
|---|---|---|---|
|  | 32 | 33 | 36 |
| Conic constant (K) | 0.00000E+00 | 0.00000E+00 | −1.06068E+00 |
| Fourth coefficient (A) | −1.56511E−06 | −3.19630E−06 | 6.97223E−07 |
| Sixth coefficient (B) | −2.07181E−08 | 1.70615E−08 | −1.69114E−09 |
| Eighth coefficient (C) | 1.82484E−10 | 4.71529E−11 | 1.83932E−12 |
| Tenth coefficient (B) | −4.14819E−13 | −1.64437E−13 | −1.18954E−15 |
| Twelfth coefficient (B) | 4.83451E−16 | 2.03802E−16 | 4.94278E−19 |
| Fourteenth coefficient (B) | −3.30665E−19 | −1.36306E−19 | −1.32845E−22 |
| Sixteenth coefficient (B) | 1.34478E−22 | 5.27951E−23 | 2.23611E−26 |
| Eighteenth coefficient (B) | −3.01429E−26 | −1.12403E−26 | −2.14531E−30 |
| Twentieth coefficient (B) | 2.86720E−30 | 1.02474E−30 | 8.95792E−35 |

In the present example, Conditional Expression (1) below is satisfied, $$0.25 < |F| \times FNO/Y\max < 0.5 \quad (1)$$

where F represents the focal length of the entire projection system 3B, FNO represents the F number of the projection system 3B, and Ymax represents the maximum image height in the reduction-side conjugate plane.

In the present example,
|F| 2.506 mm
FNO 2.2
Ymax 11.80 mm
are satisfied. Therefore, |F|×FNO/Ymax=0.476 is achieved.

In the present example, Conditional Expression (2) below is satisfied, $$0.15 < Dg1/TTL < 0.30 \quad (2)$$

where TTL represents the optical path length from the liquid crystal panel 18 in the reduction-side conjugate plane to the reflection surface of the concave mirror 36, and Dg1 represents the length of the first lens group 33.

In the present example,
TTL 336.96 mm
Dg1 60.13 mm
are satisfied. Therefore, Dg1/TTL=0.18 is achieved.

In the present example, Conditional Expression (3) below is satisfied, $$10 < Fm/|F| \quad (3)$$

where Fm represents the focal length of the reflection surface of the concave mirror 36.

In the present example,
|F| 2.506 mm
Fm 25.72 mm
are satisfied. Therefore, Fm/|F|=10.26 is achieved.

In the present example, Conditional Expression (4) below is satisfied, $$-120 < FL1/|F| < -30 \quad (4)$$

where FL1 represents the focal length of the lens L16, which is disposed in a position closest to the enlargement side in the second lens group 34.

In the present example,
|F| 2.506 mm
FL1 −251.73 mm
are satisfied. Therefore, FL1/|F|=−100.46 is achieved.

In the present example, Conditional Expression (5) below is satisfied, $$30 < RL1S2/|F| < 100 \quad (5)$$

where RL1S2 represents the radius of curvature of the reduction-side surface of the lens L16, which is disposed in the position closest to the enlargement side in the second lens group 34.

In the present example,
|F| 2.506 mm
RL1S2 113.25 mm
are satisfied. Therefore, RL1S2/|F|=45.20 is achieved.

Effects and Advantages

Figure 7:
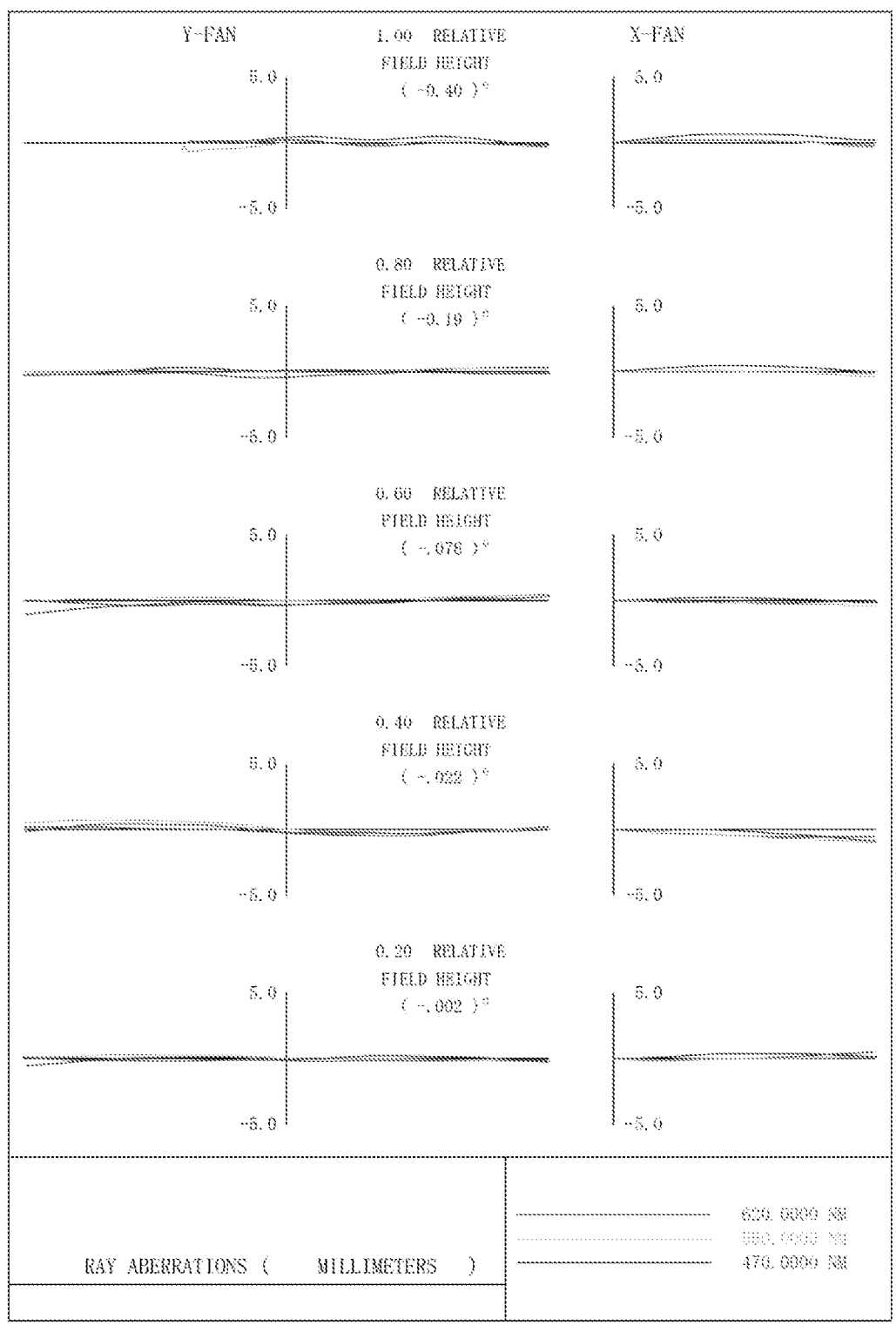
FIG. 7 shows the lateral aberrations of the image magnified by the projection system in the case of the standard distance.
Figure 8:
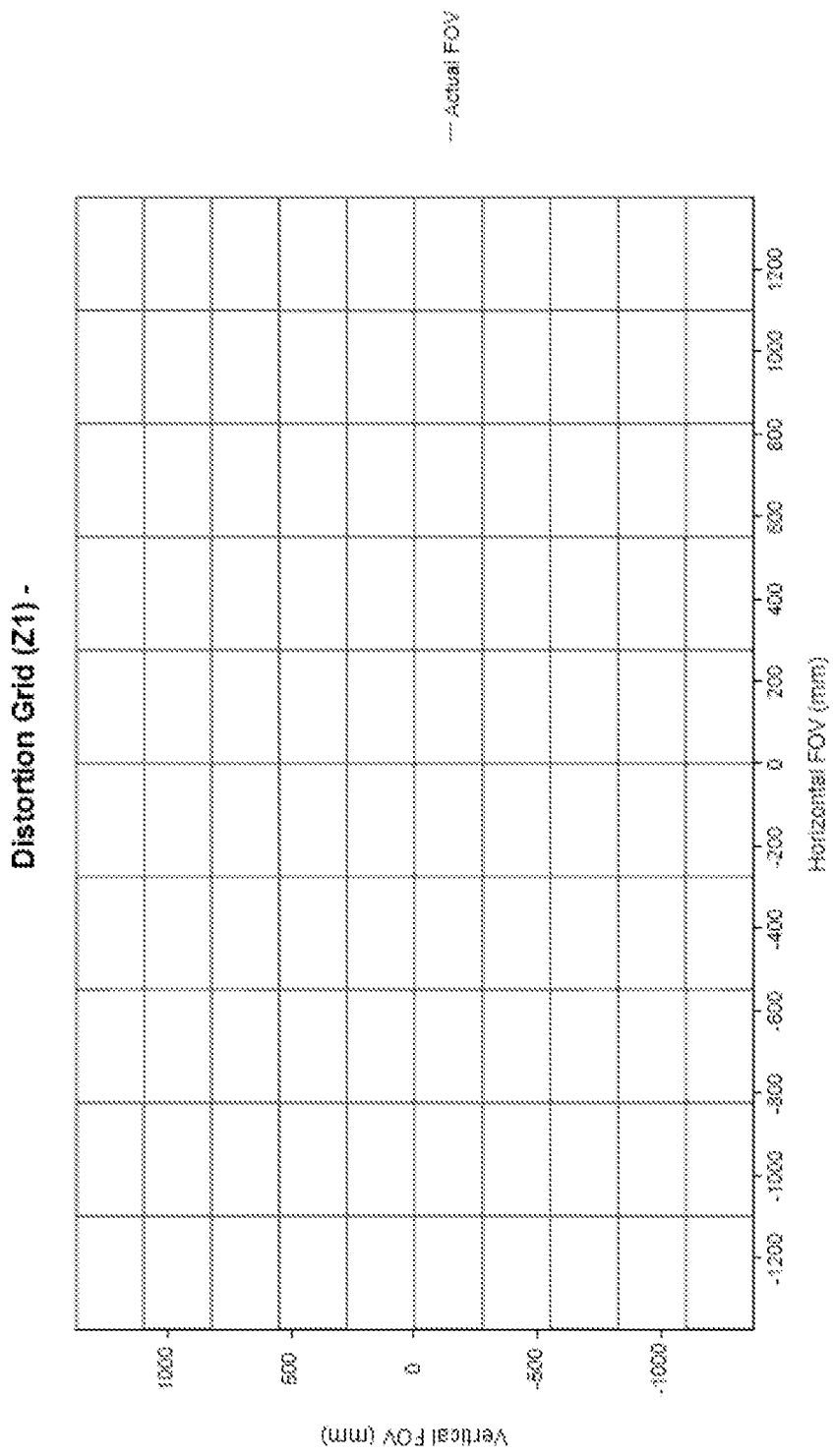
FIG. 8 shows the grid distortion of the image magnified by the projection system in the case of the standard distance.

The projection system 3B according to the present example can provide the same effects and advantages as those provided by the projection system 3A according to Example 1. FIG. 7 shows the lateral aberrations of the image magnified by the projection system 3B when the variable spacing 4 is the standard distance. FIG. 8 shows the grid distortion of the image magnified by the projection system 3B when the variable spacing 4 is the standard distance. The projection system 3B according to the present example produces a magnified image with suppressed lateral aberrations and grid distortion, as shown in FIGS. 7 and 8.

Example 3

Figure 9:
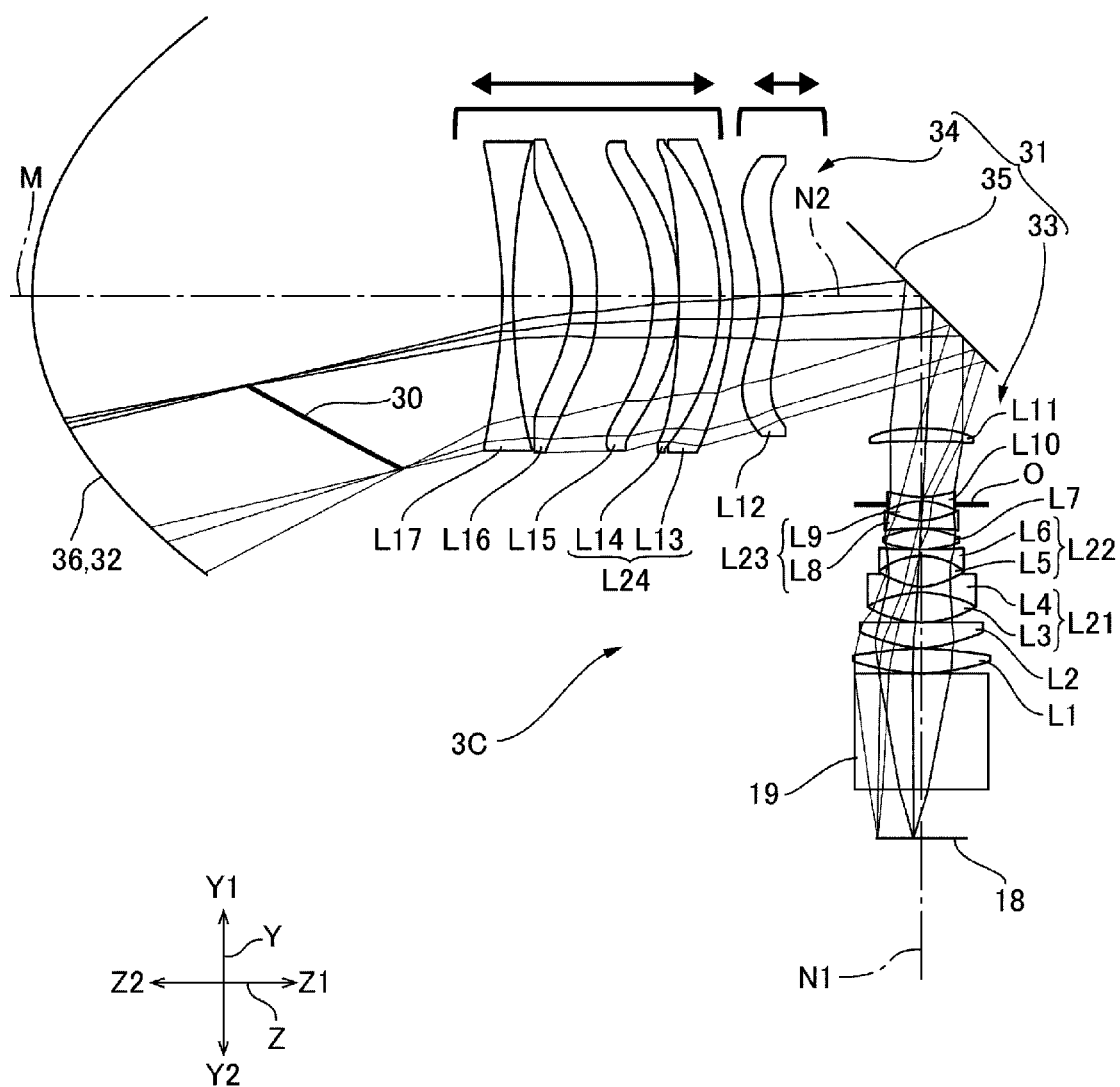
FIG. 9 is a beam diagram showing beams passing through the projection system according to Example 3.

FIG. 9 is a beam diagram showing beams passing through a projection system 3C according to Example 3. The projection system 3C includes the first optical system 31 and the second optical system 32 disposed on the enlargement side of the first optical system 31. The first optical system 31 includes the first lens group 33, the second lens group 34 disposed on the enlargement side of the first lens group 33, and the optical path deflector 35 disposed between the first lens group 33 and the second lens group 34.

The first lens group 33 has positive power. The first lens group 33 includes 11 lenses L1 to L11. The lenses L1 to L11 are arranged in the presented order from the reduction side toward the enlargement side. In the present example, the lenses L3 and L4 are bonded to each other into the first doublet L21. The lenses L5 and L6 are bonded to each other into the second doublet L22. The lenses L8 and L9 are bonded to each other into the third doublet L23. The aperture O is disposed between the lens L9 and the lens L10. The lenses L1 to L11 are made of glass. The lens L7 is an aspherical lens having aspherical shapes on opposite sides.

The second lens group 34 has negative power. The second lens group 34 includes 6 lenses L12 to L17. The lenses L12 to L17 are arranged in the presented order from the reduction side toward the enlargement side. In the present example, the lenses L13 and L14 are bonded to each other into the fourth doublet L24. The lenses L12, L15, and L16 are each an aspherical lens having aspherical shapes on opposite sides. The lenses L12, L15, and L16 are made of resin. The lenses L13, L14, and L17 (first lens) are made of glass.

The optical path deflector 35 is a flat mirror having a flat reflection surface. In the present example, the optical path deflector 35 has no power. The optical path deflector 35 inclines by 45° with respect to the axes Y and Z.

The second optical system 32 includes the concave mirror 36 having a concave reflection surface. The reflection surface of the concave mirror 36 has an aspherical shape. The third optical axis M of the concave mirror 36 is a design optical axis. The concave mirror 36 is rotationally symmetric with respect to the third optical axis M. The light from the first optical system 31 is radiated onto a region of the reflection surface of the concave mirror 36, the region shifted in the direction Y2 from the third optical axis M. The concave mirror 36 reflects the light from the first optical system 31 in the directions Z1 and Y2 to cause the light to reach the screen S.

The intermediate image 30 is formed between the second lens group 34 and the concave mirror 36.

The projection system 3C can change the projection distance thereof. When the projection distance is changed, 6 lenses of the second lens group 34, the lenses L12 to L17, are moved along the second optical axis N2 for focusing. In the focusing, the lenses L13 to L17 are moved as a unit.

Under the definition that F represents the focal length of the entire projection system 3C, FNO represents the F number of the projection system 3C, Ymax represents the maximum image height of the liquid crystal panel 18 in the reduction-side conjugate plane, TTL represents the optical path length from the liquid crystal panel 18 in the reduction-side conjugate plane to the reflection surface of the concave mirror 36 of the second optical system 32, Dg1 represents the length of the first lens group 33, Fm represents the focal length of the reflection surface of the concave mirror 36 of the second optical system 32, FL1 represents the focal length of the lens L17 disposed in the position closest to the enlargement side in the second lens group 34, and RL1S2 represents the radius of curvature of the reduction-side surface of the lens L17 disposed in the position closest to the enlargement side in the second lens group 34, data on the projection system 3C according to Example 3 are listed below. The optical path length TTL is the sum of the optical path length along the first optical axis N1 from the liquid crystal panel 18 in the reduction-side conjugate plane to the reflection surface of the optical path deflector 35 and the optical path length along the second optical axis N2 from the reflection surface of the optical path deflector 35 to the reflection surface of the concave mirror 36. The length Dg1 is the length along the first optical axis N1 from the reduction-side surface of the lens L1 to the enlargement-side surface of the lens L11.

|F| 2.312 mm
FNO 1.6
Ymax 11.28 mm
TTL 365.30 mm
Dg1 62.96 mm
Fm 28.94 mm
FL1 −92.49 mm
RL1S2 164.35 mm Data on the lenses of the projection system 3C are listed below. The surfaces of the lenses are numbered sequentially from the reduction side toward the enlargement side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number. Reference characters R and D are expressed in millimeters. The variable spacing 1 is the distance between the lenses L11 and L12. The variable spacing 2 is the distance between the lenses L12 and L13. The variable spacing 3 is the distance between the lens L17 and the concave mirror 36. The variable spacing 4 is the distance between the concave mirror 36 and the screen S, that is, the projection distance.

| Reference character | Surface number | R | D | nd | vd |
|---|---|---|---|---|---|
| 18 | 0 | infinity | 12.490 | | |
| 19 | 1 | infinity | 29.860 | 1.51630 | 64.10 |
| | 2 | infinity | 0.000 | | |
| L1 | 3 | 50.77 | 6.111 | 1.84666 | 23.78 |
| | 4 | −102.01 | 0.634 | | |
| L2 | 5 | 35.37 | 6.373 | 1.48749 | 70.24 |
| | 6 | −523.46 | 0.200 | | |
| L3 | 7 | 28.11 | 7.375 | 1.48749 | 70.24 |
| L4 | 8 | −26.92 | 1.500 | 1.84666 | 23.78 |
| | 9 | 16.25 | 0.200 | | |
| L5 | 10 | 15.87 | 7.720 | 1.48749 | 70.24 |
| L6 | 11 | −18.55 | 1.500 | 1.84666 | 23.78 |
| | 12 | 101.47 | 0.200 | | |
| L7 | 13* | 27.30 | 5.258 | 1.68948 | 31.02 |
| | 14* | −21.15 | 0.200 | | |
| L8 | 15 | −51.16 | 1.500 | 1.90366 | 31.34 |
| L9 | 16 | 16.69 | 5.090 | 1.84666 | 23.78 |
| | 17 | −28.77 | −1.055 | | |

-continued

| Reference character | Surface number | R | D | nd | vd |
|---|---|---|---|---|---|
| O | 18 | infinity | 1.555 | | |
| L10 | 19 | −38.97 | 1.038 | 1.83481 | 42.71 |
| | 20 | 30.71 | 14.474 | | |
| L11 | 21 | −128.59 | 3.085 | 1.84666 | 23.78 |
| | 22 | −39.61 | Variable spacing 1 | | |
| | 23 | infinity | −35.000 | | |
| 35 | 24 | infinity | 0.000 | Reflection surface | |
| | 25 | infinity | 0.000 | | |
| | 26 | infinity | −35.000 | | |
| L12 | 27* | −48.76 | −6.000 | 1.53113 | 55.75 |
| | 28* | −41.05 | Variable spacing 2 | | |
| L13 | 29 | −94.56 | −3.000 | 1.84666 | 23.78 |
| L14 | 30 | −63.02 | −10.000 | 1.68893 | 31.08 |
| | 31 | −141.60 | −0.500 | | |
| L15 | 32* | −58.36 | −6.400 | 1.53113 | 55.75 |
| | 33* | −62.23 | −14.821 | | |
| L16 | 34* | −149.84 | −6.000 | 1.53113 | 55.75 |
| | 35* | −49.88 | −14.913 | | |
| L17 | 36 | 164.35 | −3.000 | 1.90366 | 31.34 |
| | 37 | −173.92 | Variable spacing 3 | | |
| 36 | 38* | 57.88 | Variable spacing 4 | Reflection surface | |
| S | 39 | infinity | 0.000 | | |

The projection system 3C according to the present example can change the projection distance thereof to the one selected from the standard distance, the short distance shorter than the standard distance, and the long distance longer than the standard distance. When the projection distance is the reference distance, the variable spacing 4 is 411.80 mm. When the projection distance is the short distance, the variable spacing 4 is 336.50 mm. When the projection distance is the long distance, the variable spacing 4 is 599.54 mm. When the projection distance is changed from the standard distance to another, the lens L12 of the second lens group 34 is moved for focusing. The variable spacing 1 thus changes. When the projection distance is changed, the lenses L13 to L17 of the second lens group 34 are further moved as a unit for focusing. The variable spacings 2 and 3 thus change. The relationship among the variable spacings 1, 2, 3, and 4 is as follows:

| | D | | |
|---|---|---|---|
| | Short distance | Standard distance | Long distance |
| Variable spacing 1 | 73.28 | 69.44 | 64.99 |
| Variable spacing 2 | −1.84 | −6.67 | −12.33 |

-continued

| | D | | |
|---|---|---|---|
| | Short distance | Standard distance | Long distance |
| Variable spacing 3 | −120.24 | −119.25 | −118.04 |
| Variable spacing 4 | 336.50 | 411.80 | 599.54 |

The aspherical coefficients are listed below.

| | Surface number | | | |
|---|---|---|---|---|
| | 13 | 14 | 27 | 28 |
| Conic constant (K) | −1.53395E+00 | 0.00000E+00 | 0.00000E+00 | 0.00000E+00 |
| Fourth coefficient (A) | −7.13761E−06 | 1.52146E−05 | −8.23069E−07 | −3.36971E−06 |
| Sixth coefficient (B) | −1.04166E−06 | −2.75373E−07 | 5.60267E−08 | 8.80457E−08 |
| Eighth coefficient (C) | 6.21981E−08 | 2.21133E−08 | −1.08550E−10 | −2.27532E−10 |
| Tenth coefficient (B) | −2.19451E−09 | −9.77636E−10 | 9.56701E−14 | 3.63635E−13 |
| Twelfth coefficient (B) | 4.79661E−11 | 2.51820E−11 | 2.28974E−18 | −3.88477E−16 |
| Fourteenth coefficient (B) | −6.57823E−13 | −3.92612E−13 | −9.25671E−20 | 2.79438E−19 |
| Sixteenth coefficient (B) | 5.49431E−15 | 3.64202E−15 | 9.45577E−23 | −1.29558E−22 |
| Eighteenth coefficient (B) | −2.54870E−17 | −1.84728E−17 | −4.32918E−26 | 3.48184E−26 |
| Twentieth coefficient (B) | 5.01106E−20 | 3.92928E−20 | 8.12555E−30 | −4.05114E−30 |

| | Surface number | | | |
|---|---|---|---|---|
| | 32 | 33 | 34 | 35 |
| Conic constant (K) | 0.00000E+00 | 0.00000E+00 | 0.00000E+00 | 0.00000E+00 |
| Fourth coefficient (A) | 1.41222E−05 | 2.11105E−05 | −2.39693E−05 | −1.80129E−05 |
| Sixth coefficient (B) | −8.65434E−08 | −1.50380E−07 | 1.13389E−08 | 3.42863E−08 |
| Eighth coefficient (C) | 1.99659E−10 | 3.94211E−10 | 7.96189E−11 | 1.80203E−11 |
| Tenth coefficient (B) | −2.51590E−13 | −5.71333E−13 | −2.03185E−13 | −1.18768E−13 |
| Twelfth coefficient (B) | 1.91140E−16 | 5.14453E−16 | 2.50062E−16 | 1.75777E−16 |
| Fourteenth coefficient (B) | −8.76057E−20 | −2.94577E−19 | −1.81449E−19 | −1.37020E−19 |
| Sixteenth coefficient (B) | 2.27636E−23 | 1.04757E−22 | 7.84292E−23 | 6.05467E−23 |
| Eighteenth coefficient (B) | −2.75630E−27 | −2.11806E−26 | −1.86971E−26 | −1.42797E−26 |
| Twentieth coefficient (B) | 6.57686E−32 | 1.86870E−30 | 1.89533E−30 | 1.39365E−30 |

| | Surface number 38 |
|---|---|
| Conic constant (K) | −1.06883E+00 |
| Fourth coefficient (A) | −1.84457E−07 |
| Sixth coefficient (B) | 8.75173E−11 |
| Eighth coefficient (C) | −9.85365E−15 |
| Tenth coefficient (B) | −7.45769E−18 |
| Twelfth coefficient (B) | 5.44226E−21 |
| Fourteenth coefficient (B) | −1.66918E−24 |
| Sixteenth coefficient (B) | 2.79313E−28 |
| Eighteenth coefficient (B) | −2.47696E−32 |
| Twentieth coefficient (B) | 9.13006E−37 |

In the present example, Conditional Expression (1) below is satisfied, $$0.25 < |F| \times FNO/Y\max < 0.5 \quad (1)$$

where F represents the focal length of the entire projection system 3C, FNO represents the F number of the projection system 3C, and Ymax represents the maximum image height in the reduction-side conjugate plane.

In the present example,
|F| 2.312 mm
FNO 1.6
Ymax 11.28 mm
are satisfied. Therefore, |F|×FNO/Ymax=0.328 is achieved.

In the present example, Conditional Expression (2) below is satisfied, $$0.15 < Dg1/TTL < 0.30 \quad (2)$$

where TTL represents the optical path length from the liquid crystal panel 18 in the reduction-side conjugate plane to the reflection surface of the concave mirror 36, and Dg1 represents the length of the first lens group 33.

In the present example,
TTL 365.30 mm
Dg1 62.96 mm
are satisfied. Therefore, Dg1/TTL=0.17 is achieved.

In the present example, Conditional Expression (3) below is satisfied, $$10 < Fm/|F| \quad (3)$$

where Fm represents the focal length of the reflection surface of the concave mirror 36.

In the present example,
|F| 2.312 mm
Fm 28.94 mm
are satisfied. Therefore, Fm/|F|=12.52 is achieved.

In the present example, Conditional Expression (4) below is satisfied, $$-120 < FL1/|F| < -30 \quad (4)$$

where FL1 represents the focal length of the lens L17, which is disposed in a position closest to the enlargement side in the second lens group 34.

In the present example,
|F| 2.312 mm
FL1 −92.49 mm
are satisfied. Therefore, FL1/|F|=−40.01 is achieved.

In the present example, Conditional Expression (5) below is satisfied, $$30 < RL1S2/|F| < 100 \tag{5}$$

where RL1S2 represents the radius of curvature of the reduction-side surface of the lens L17, which is disposed in the position closest to the enlargement side in the second lens group 34.

In the present example,

|F| 2.312 mm
RL1S2 164.35 mm are satisfied. Therefore, RL1S2/|F|=71.10 is achieved.

Effects and Advantages

Figure 10:
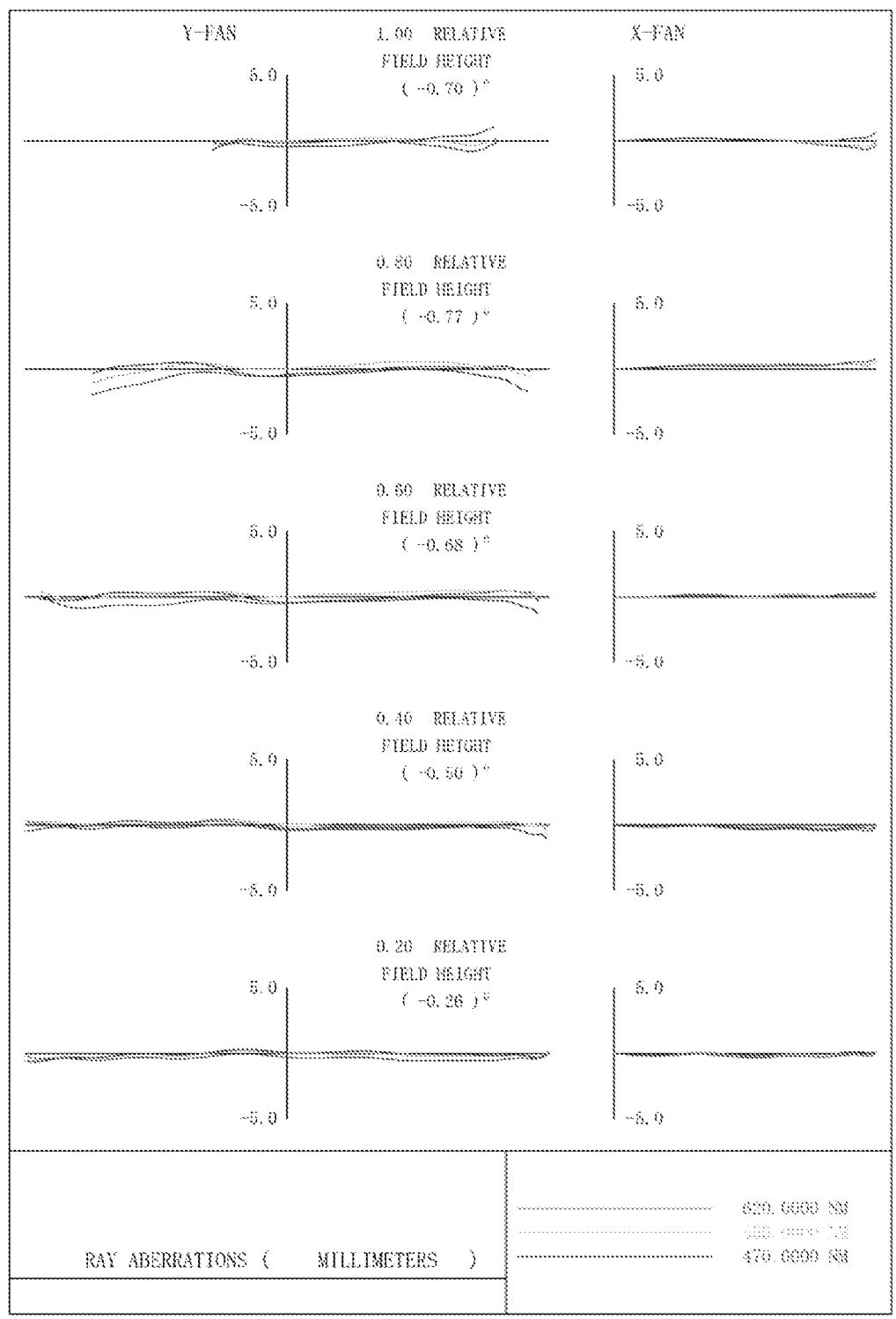
FIG. 10 shows the lateral aberrations of the image magnified by the projection system in the case of the standard distance.
Figure 11:
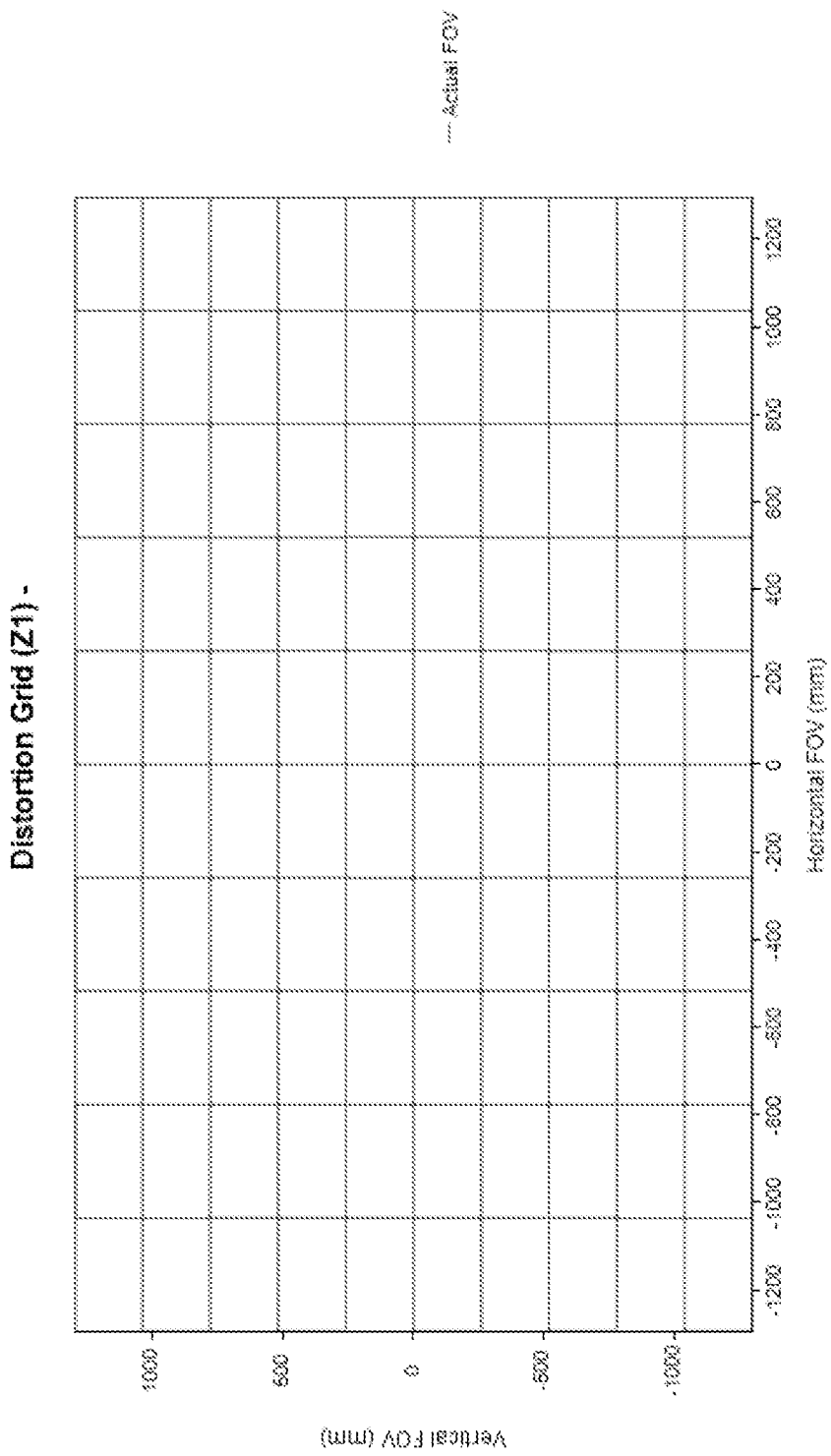
FIG. 11 shows the grid distortion of the image magnified by the projection system in the case of the standard distance.

The projection system 3C according to the present example can provide the same effects and advantages as those provided by the projection system 3A according to Example 1. FIG. 10 shows the lateral aberrations of the image magnified by the projection system 3C when the variable spacing 4 is the standard distance. FIG. 11 shows the grid distortion of the image magnified by the projection system 3C when the variable spacing 4 is the standard distance. The projection system 3C according to the present example produces a magnified image with suppressed lateral aberrations and grid distortion, as shown in FIGS. 10 and 11.

Example 4

Figure 12:
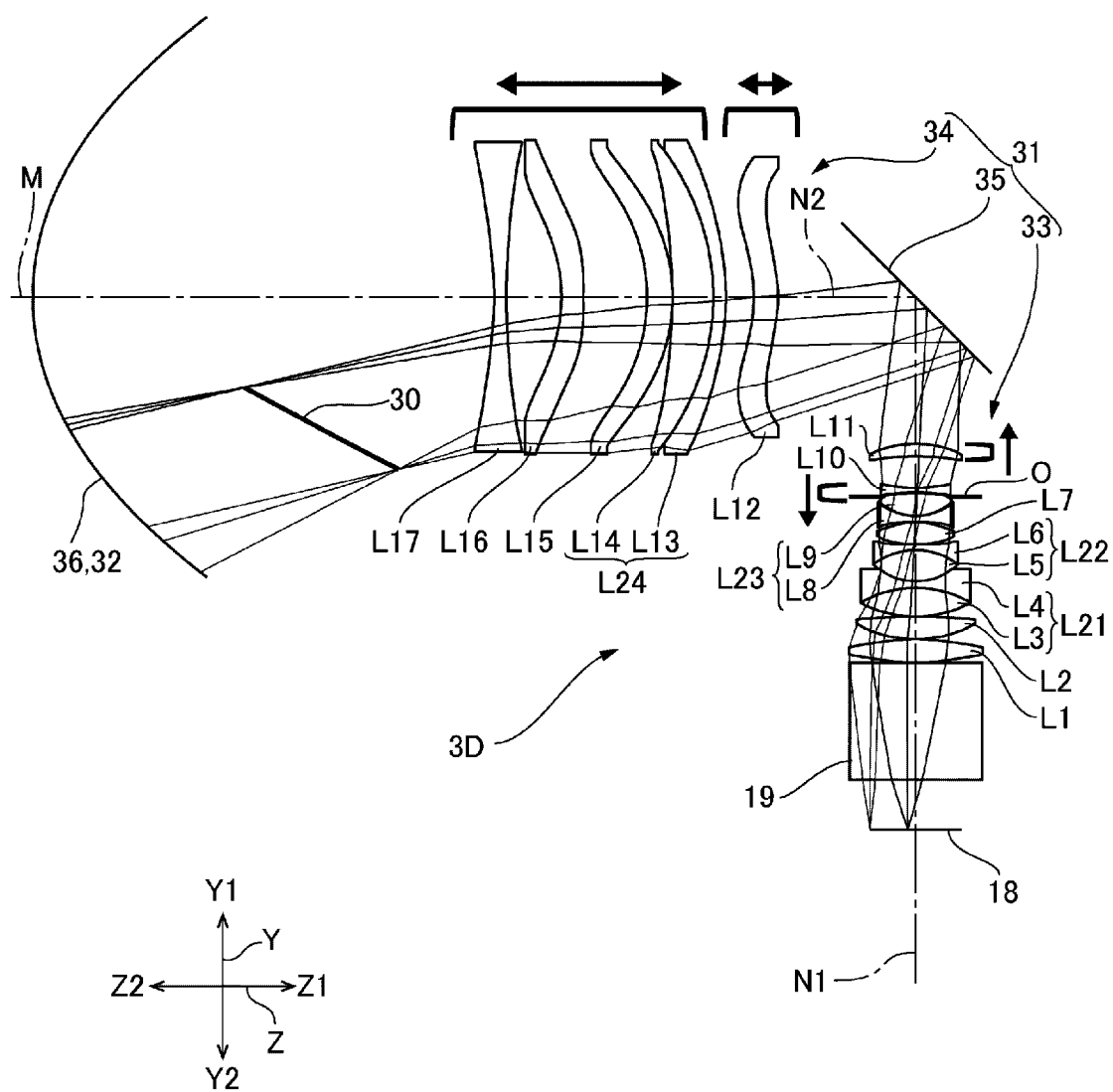
FIG. 12 is a beam diagram showing beams passing through the projection system according to Example 4.

FIG. 12 is a beam diagram showing beams passing through a projection system 3D according to Example 4. The projection system 3D includes the first optical system 31 and the second optical system 32 disposed on the enlargement side of the first optical system 31. The first optical system 31 includes the first lens group 33, the second lens group 34 disposed on the enlargement side of the first lens group 33, and the optical path deflector 35 disposed between the first lens group 33 and the second lens group 34.

The first lens group 33 has positive power. The first lens group 33 includes 11 lenses L1 to L11. The lenses L1 to L11 are arranged in the presented order from the reduction side toward the enlargement side. In the present example, the lenses L3 and L4 are bonded to each other into the first doublet L21. The lenses L5 and L6 are bonded to each other into the second doublet L22. The lenses L8 and L9 are bonded to each other into the third doublet L23. The aperture O is disposed between the lens L9 and the lens L10. The lenses L1 to L11 are made of glass. The lens L7 is an aspherical lens having aspherical shapes on opposite sides.

The second lens group 34 has negative power. The second lens group 34 includes 6 lenses L12 to L17. The lenses L12 to L17 are arranged in the presented order from the reduction side toward the enlargement side. In the present example, the lenses L13 and L14 are bonded to each other into the fourth doublet L24. The lenses L12, L15, and L16 are each an aspherical lens having aspherical shapes on opposite sides. The lenses L12, L15, and L16 are made of resin. The lenses L13, L14, and L17 (first lens) are made of glass.

The optical path deflector 35 is a flat mirror having a flat reflection surface. In the present example, the optical path deflector 35 has no power. The optical path deflector 35 inclines by 45° with respect to the axes Y and Z.

The second optical system 32 includes the concave mirror 36 having a concave reflection surface. The reflection surface of the concave mirror 36 has an aspherical shape. The third optical axis M of the concave mirror 36 is a design optical axis. The concave mirror 36 is rotationally symmetric with respect to the third optical axis M. The light from the first optical system 31 is radiated onto a region of the reflection surface of the concave mirror 36, the region shifted in the direction Y2 from the third optical axis M. The concave mirror 36 reflects the light from the first optical system 31 in the directions Z1 and Y2 to cause the light to reach the screen S.

The intermediate image 30 is formed between the second lens group 34 and the concave mirror 36.

The projection system 3D can change the projection distance thereof. When the projection distance is changed, 6 lenses of the second lens group 34, the lenses L12 to L17, are moved along the second optical axis N2 for focusing. In the focusing, the lenses L13 to L17 are moved as a unit.

The projection system 3D can also change the magnification factor by which a projection image is magnified. Two lenses of the first lens group 33, the lenses L10 and L11, are moved along the first optical axis N1 for zooming. In the present example, the zooming magnifies the projection image by a factor of 1.04.

Under the definition that F represents the focal length of the entire projection system 3D, FNO represents the F number of the projection system 3D, Ymax represents the maximum image height of the liquid crystal panel 18 in the reduction-side conjugate plane, TTL represents the optical path length from the liquid crystal panel 18 in the reduction-side conjugate plane to the reflection surface of the concave mirror 36 of the second optical system 32, Dg1 represents the length of the first lens group 33, Fm represents the focal length of the reflection surface of the concave mirror 36 of the second optical system 32, FL1 represents the focal length of the lens L17 disposed in the position closest to the enlargement side in the second lens group 34, and RL1S2 represents the radius of curvature of the reduction-side surface of the lens L17 disposed in the position closest to the enlargement side in the second lens group 34, data on the projection system 3D according to Example 4 are listed below. The optical path length TTL is the sum of the optical path length along the first optical axis N1 from the liquid crystal panel 18 in the reduction-side conjugate plane to the reflection surface of the optical path deflector 35 and the optical path length along the second optical axis N2 from the reflection surface of the optical path deflector 35 to the reflection surface of the concave mirror 36. The length Dg1 is the length along the first optical axis N1 from the reduction-side surface of the lens L1 to the enlargement-side surface of the lens L11.

|F| 2.326 mm
FNO 1.8
Ymax 11.28 mm
TTL 360.40 mm
Dg1 54.98 mm
Fm 28.39 mm
FL1 −89.39 mm
RL1S2 186.70 mm Data on the lenses of the projection system 3D are listed below. The surfaces of the lenses are numbered sequentially from the reduction side toward the enlargement side. Reference characters are given to the screen, the lenses, the dichroic prism, and the liquid crystal panels. Data labeled with a surface number that does not correspond to any of the screen, the lenses, the dichroic prism, or the liquid crystal panels is dummy data. An aspherical surface has a surface number followed by *. Reference character R represents the radius of curvature. Reference character D represents the on-axis inter-surface spacing. Reference character nd represents the refractive index. Reference character vd represents the Abbe number. Reference characters R and D are expressed in millimeters. The variable spacing 1 is the distance between the aperture stop O and the lens L10. The variable spacing 2 is the distance between the lenses L10 and L11. The variable spacing 3 is the distance between the lenses L11 and the optical path deflector 35. The variable spacing 4 is the distance between the optical path deflector 35 and the lens L12. A variable spacing 5 is the distance between the lenses L12 and L13. A variable spacing 6 is the distance between the lens L17 and the concave mirror 36. A variable spacing 7 is the distance between the concave mirror 36 and the screen S, that is, the projection distance.

| Reference character | Surface number | R | D | nd | vd |
|---|---|---|---|---|---|
| 18 | 0 | infinity | 12.490 | | |
| 19 | 1 | infinity | 29.860 | 1.51630 | 64.10 |
| | 2 | infinity | 0.000 | | |
| L1 | 3 | 66.00 | 5.791 | 1.84666 | 23.78 |
| | 4 | −71.87 | 0.200 | | |
| L2 | 5 | 33.87 | 5.590 | 1.48749 | 70.24 |
| | 6 | −186.34 | 0.200 | | |
| L3 | 7 | 33.62 | 7.278 | 1.48749 | 70.24 |
| L4 | 8 | −26.30 | 1.500 | 1.84666 | 23.78 |
| | 9 | 16.53 | 0.200 | | |
| L5 | 10 | 15.92 | 7.698 | 1.48749 | 70.24 |
| L6 | 11 | −19.47 | 1.500 | 1.84666 | 23.78 |
| | 12 | 80.03 | 0.200 | | |
| L7 | 13* | 27.86 | 5.428 | 1.68948 | 31.02 |
| | 14* | −21.34 | 0.200 | | |
| L8 | 15 | −40.73 | 1.500 | 1.90366 | 31.34 |
| L9 | 16 | 14.28 | 5.477 | 1.84666 | 23.78 |
| | 17 | −42.06 | −0.723 | | |
| O | 18 | infinity | Variable spacing 1 | | |
| L10 | 19 | −53.61 | 1.000 | 1.83481 | 42.71 |
| | 20 | 41.26 | Variable spacing 2 | | |
| L11 | 21 | −74.01 | 3.142 | 1.84666 | 23.78 |
| | 22 | −28.45 | Variable spacing 3 | | |
| | 23 | infinity | Variable spacing 4 | | |
| 35 | 24 | infinity | −35.000 | Reflection surface | |
| | 25 | infinity | 0.000 | | |
| | 26 | infinity | −35.000 | | |
| L12 | 27* | −47.55 | −6.000 | 1.53113 | 55.75 |
| | 28* | −40.35 | Variable spacing 5 | | |
| L13 | 29 | −85.17 | −3.095 | 1.84666 | 23.78 |
| L14 | 30 | −63.92 | −10.000 | 1.68893 | 31.08 |
| | 31 | −126.04 | −0.500 | | |
| L15 | 32* | −49.67 | −6.400 | 1.53113 | 55.75 |
| | 33* | −53.15 | −16.10 | | |
| L16 | 34* | −153.08 | −6.00 | 1.53113 | 55.75 |
| | 35* | −50.64 | −14.14 | | |
| L17 | 36 | 186.70 | −3.00 | 1.90366 | 31.34 |
| | 37 | −145.19 | Variable spacing 6 | | |
| 36 | 38* | 56.79 | Variable spacing 7 | Reflection surface | |
| S | 39 | infinity | | | |

The projection system 3D according to the present example can change the projection distance thereof to the one selected from the standard distance, the short distance shorter than the standard distance, and the long distance longer than the standard distance. When the projection distance is the standard distance, the variable spacing 7 is 411.80 mm. When the projection distance is the short distance, the variable spacing 7 is 336.30 mm. When the projection distance is the long distance, the variable spacing 7 is 600.83 mm. When the projection distance is changed from the standard distance to another, the lens L12 of the second lens group 34 is moved for focusing. The variable spacing 4 thus changes. When the projection distance is changed, the lenses L13 to L17 of the second lens group 34 are further moved as a unit for focusing. The variable spacings 5 and 6 thus change. The relationship among the variable spacings 1, 2, 3, 4, 5, 6, and 7 is as follows:

| | D | | |
|---|---|---|---|
| | Short distance | Standard distance | Long distance |
| Variable spacing 1 | 2.05 | 2.05 | 2.05 |
| Variable spacing 2 | 6.75 | 6.75 | 6.75 |
| Variable spacing 3 | 12.27 | 12.27 | 12.27 |
| Variable spacing 4 | 64.72 | 60.36 | 56.88 |
| Variable spacing 5 | −1.82 | −7.15 | −11.69 |
| Variable spacing 6 | −119.02 | −118.05 | −116.99 |
| Variable spacing 7 | 336.30 | 411.80 | 600.83 |

The relationship among the variable spacings 1, 2, 3, 4, 5, 6, and 7 in the case where the zooming is performed is listed below. To perform the zooming, the lens L10 of the first lens group 33 is moved. The variable spacing 1 thus changes. To perform the zooming, the lens L11 of the first lens group 33 is further moved. The variable spacings 2 and 3 thus change. The following table shows only the case where the variable spacing 7 is set at 411.80 mm, which is the standard distance.

| D | Standard distance (Variable magnification) |
|---|---|
| Variable spacing 1 | 1.22 |
| Variable spacing 2 | 7.95 |
| Variable spacing 3 | 11.87 |
| Variable spacing 4 | 60.36 |
| Variable spacing 5 | −7.15 |
| Variable spacing 6 | −118.05 |
| Variable spacing 7 | 432.39 |

The aspherical coefficients are listed below.

| | Surface number | | | |
|---|---|---|---|---|
| | 13 | 14 | 27 | 28 |
| Conic constant (K) | −7.37987E−01 | 0.00000E+00 | 0.00000E+00 | 0.00000E+00 |
| Fourth coefficient (A) | −1.98840E−06 | 1.15262E−05 | −1.95171E−06 | −5.15364E−06 |
| Sixth coefficient (B) | −1.02912E−06 | −2.56569E−07 | 5.79023E−08 | 9.28180E−08 |
| Eighth coefficient (C) | 6.21047E−08 | 2.21465E−08 | −1.06364E−10 | −2.38025E−10 |
| Tenth coefficient (B) | −2.19438E−09 | −9.77367E−10 | 7.29356E−14 | 3.81293E−13 |

-continued

| | | | | |
|---|---|---|---|---|
| Twelfth coefficient (B) | 4.79744E−11 | 2.51783E−11 | 6.87698E−17 | −4.07372E−16 |
| Fourteenth coefficient (B) | −6.57778E−13 | −3.92691E−13 | −1.93714E−19 | 2.91041E−19 |
| Sixteenth coefficient (B) | 5.49336E−15 | 3.64219E−15 | 1.79792E−22 | −1.32899E−22 |
| Eighteenth coefficient (B) | −2.55020E−17 | −1.84581E−17 | −8.07943E−26 | 3.49083E−26 |
| Twentieth coefficient (B) | 5.03261E−20 | 3.92650E−20 | 1.48422E−29 | −3.93972E−30 |

| | Surface number | | | |
|---|---|---|---|---|
| | 32 | 33 | 34 | 35 |
| Conic constant (K) | 0.00000E+00 | 0.00000E+00 | 0.00000E+00 | 0.00000E+00 |
| Fourth coefficient (A) | 1.40186E−05 | 2.19476E−05 | −2.35653E−05 | −1.77002E−05 |
| Sixth coefficient (B) | −8.58875E−08 | −1.57644E−07 | 5.41669E−09 | 2.71395E−08 |
| Eighth coefficient (C) | 1.98040E−10 | 4.20311E−10 | 1.02321E−10 | 5.07979E−11 |
| Tenth coefficient (B) | −2.48241E−13 | −6.24877E−13 | −2.47441E−13 | −1.91065E−13 |
| Twelfth coefficient (B) | 1.86525E−16 | 5.83007E−16 | 3.00289E−16 | 2.68962E−16 |
| Fourteenth coefficient (B) | −8.28766E−20 | −3.49929E−19 | −2.16025E−19 | −2.11174E−19 |
| Sixteenth coefficient (B) | 1.93653E−23 | 1.31931E−22 | 9.24675E−23 | 9.63216E−23 |
| Eighteenth coefficient (B) | −1.36211E−27 | −2.85320E−26 | −2.16822E−26 | −2.38104E−26 |
| Twentieth coefficient (B) | −1.67493E−31 | 2.70496E−30 | 2.12926E−30 | 2.45742E−30 |

| | Surface number 38 |
|---|---|
| Conic constant (K) | −1.06873E+00 |
| Fourth coefficient (A) | −1.48865E−07 |
| Sixth coefficient (B) | 6.64118E−12 |
| Eighth coefficient (C) | 6.63623E−14 |
| Tenth coefficient (B) | −5.02653E−17 |
| Twelfth coefficient (B) | 2.10108E−20 |
| Fourteenth coefficient (B) | −5.35476E−24 |
| Sixteenth coefficient (B) | 8.27472E−28 |
| Eighteenth coefficient (B) | −7.12133E−32 |
| Twentieth coefficient (B) | 2.61990E−36 |

In the present example, Conditional Expression (1) below is satisfied, $$0.25 < |F| \times FNO/Ymax < 0.5 \quad (1)$$

where F represents the focal length of the entire projection system 3D, FNO represents the F number of the projection system 3D, and Ymax represents the maximum image height in the reduction-side conjugate plane.

In the present example,
|F| 2.326 mm
FNO 1.8
Ymax 11.28 mm
are satisfied. Therefore, |F|×FNO/Ymax=0.371 is achieved.

In the present example, Conditional Expression (2) below is satisfied, $$0.15 < Dg1/TTL < 0.30 \quad (2)$$

where TTL represents the optical path length from the liquid crystal panel 18 in the reduction-side conjugate plane to the reflection surface of the concave mirror 36, and Dg1 represents the length of the first lens group 33.

In the present example,
TTL 360.40 mm
Dg1 54.98 mm
are satisfied. Therefore, Dg1/TTL=0.15 is achieved.

In the present example, Conditional Expression (3) below is satisfied, $$10 < Fm/|F| \quad (3)$$

where Fm represents the focal length of the reflection surface of the concave mirror 36.

In the present example,
|F| 2.326 mm
Fm 28.39 mm
are satisfied. Therefore, Fm/|F|=12.21 is achieved.

In the present example, Conditional Expression (4) below is satisfied, $$-120 < FL1/|F| < -30 \quad (4)$$

where FL1 represents the focal length of the lens L17, which is disposed in the position closest to the enlargement side in the second lens group 34.

In the present example,
|F| 2.326 mm
FL1 −89.39 mm
are satisfied. Therefore, FL1/|F|=−38.43 is achieved.

In the present example, Conditional Expression (5) below is satisfied, $$30 < RL1S2/|F| < 100 \quad (5)$$

where RL1S2 represents the radius of curvature of the reduction-side surface of the lens L17, which is disposed in the position closest to the enlargement side in the second lens group 34.

In the present example,
|F| 2.326 mm
RL1S2 186.70 mm
are satisfied. Therefore, RL1S2/|F|=80.26 is achieved.

Effects and Advantages

Figure 13:
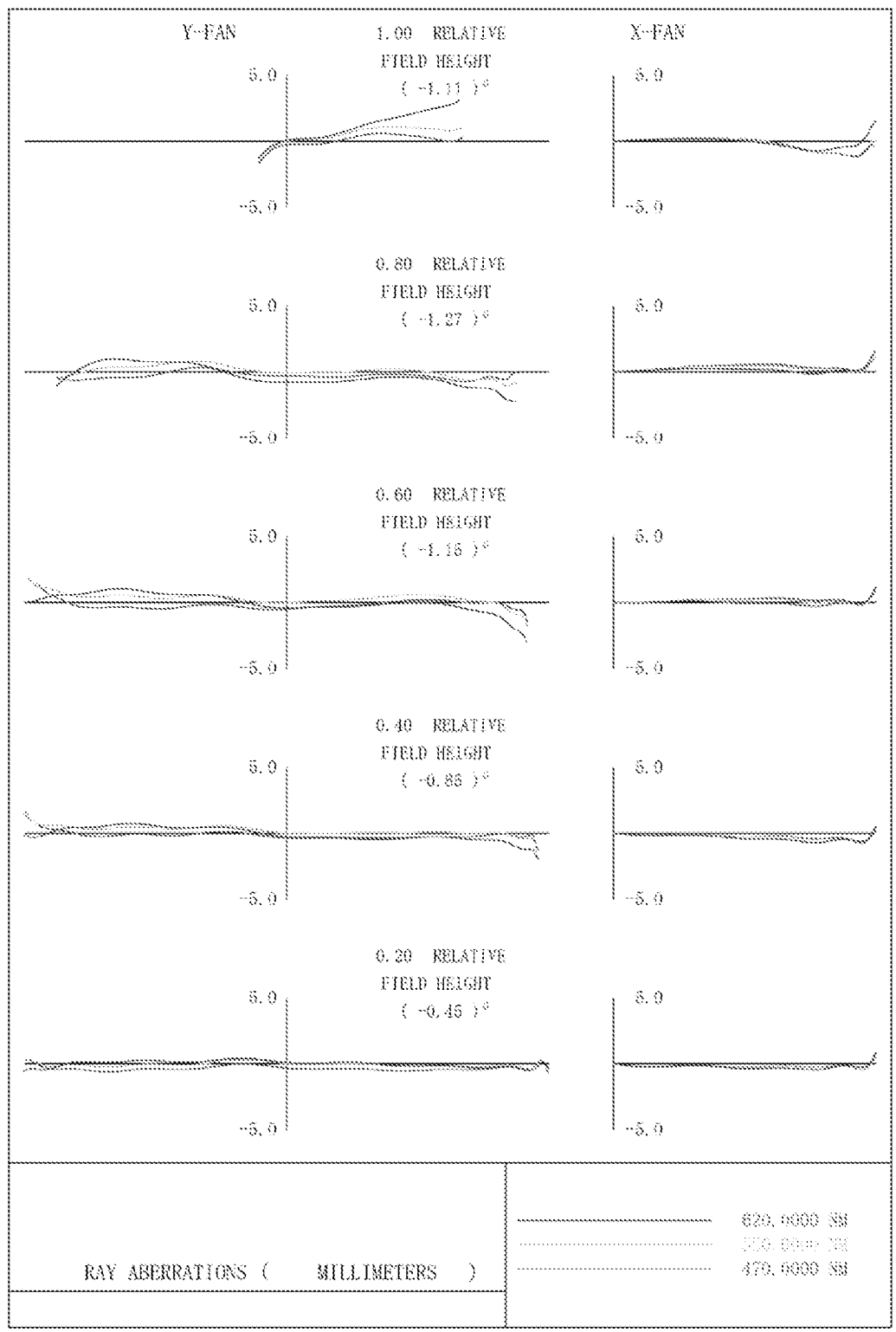
FIG. 13 shows the lateral aberrations of the image magnified by the projection system in the case of the standard distance.
Figure 14:
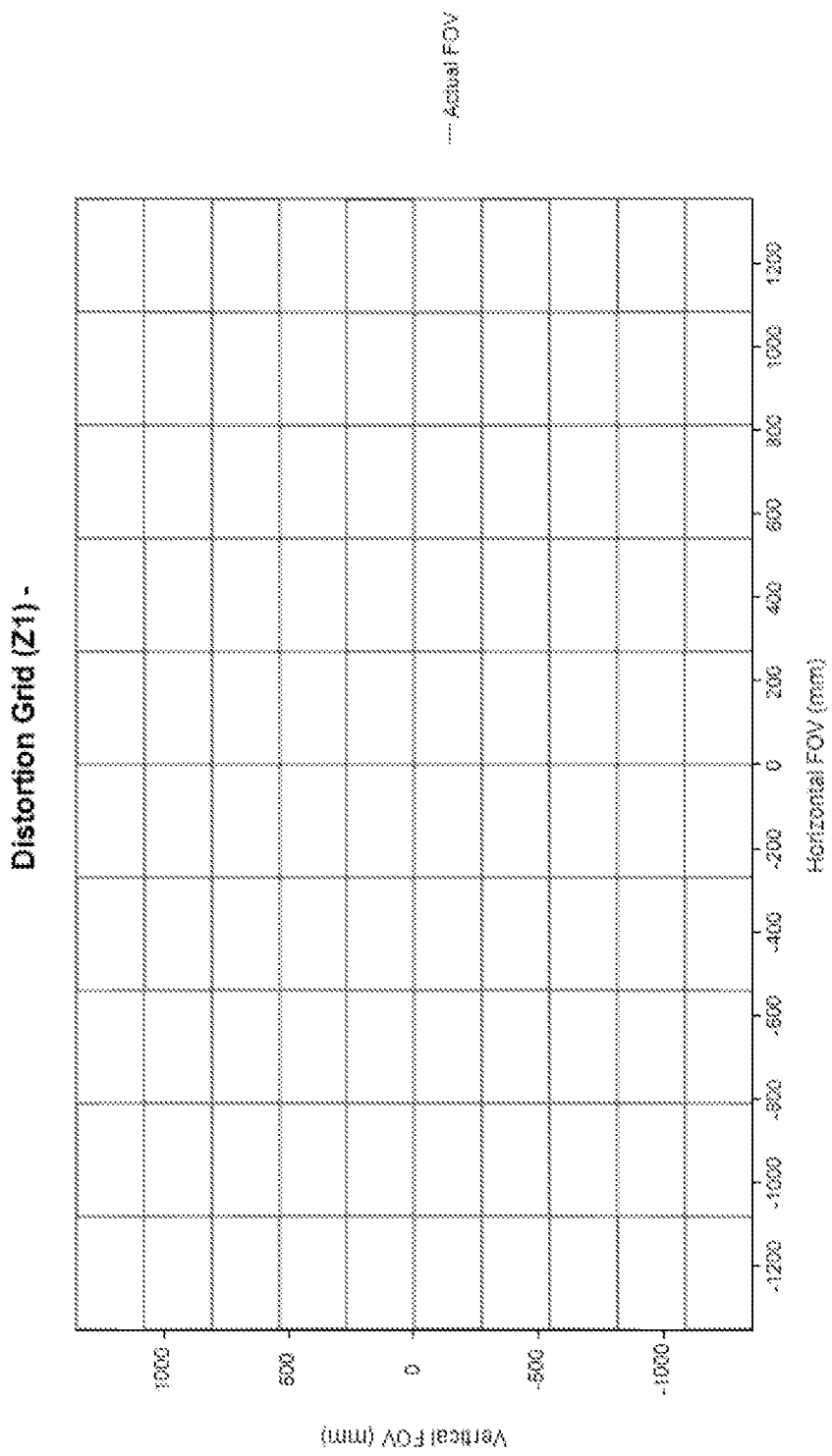
FIG. 14 shows the grid distortion of the image magnified by the projection system in the case of the standard distance.

The projection system 3D according to the present example can provide the same effects and advantages as those provided by the projection system 3A according to Example 1. FIG. 13 shows the lateral aberrations of the image magnified by the projection system 3D when the variable spacing 7 is the standard distance. FIG. 14 shows the grid distortion of the image magnified by the projection system 3D when the variable spacing 7 is the standard distance. The projection system 3D according to the present example produces a magnified image with suppressed lateral aberrations and grid distortion, as shown in FIGS. 13 and 14.

Other Examples

In the examples described above, the optical path deflector 35 deflects the optical path of the projection system by 90° between the first lens group 33 and the second lens group 34, but not necessarily. For example, the angle by which the optical path is deflected may be 45° or 120°. As long as the optical path deflector 35 can deflect the optical path between the first lens group 33 and the second lens group 34, the reduction-side conjugate plane can be located in a position closer to the second optical system as compared with the case where the lenses of the first lens group and the lenses of the second lens group of the first optical system are arranged along a linearly extending optical axis.

What is claimed is:

1. A projection system that projects an image in a reduction-side conjugate plane onto an enlargement-side conjugate plane, the projection system comprising:
a first optical system; and
a second optical system disposed on an enlargement side of the first optical system,
wherein the first optical system includes a first lens group having positive power, a second lens group disposed on the enlargement side of the first lens group and having negative power, and an optical path deflector disposed between the first lens group and the second lens group,
the second optical system includes a reflection member having a concave reflection surface,
the second lens group includes three aspherical lenses,
Conditional Expression (1) below is satisfied, $$0.25<|F|\times FNO/Y\max<0.5 \tag{1}$$

where F represents a focal length of entirety of the projection system, FNO represents an F number of the projection system, and Ymax represents a maximum image height in the reduction-side conjugate plane, and
wherein Conditional Expression (2) below is satisfied, $$0.15<Dg1/TTL<0.30 \tag{2}$$

where TTL is an optical path length from the reduction-side conjugate plane to the reflection surface, and Dg1 represents a length of the first lens group.

2. A projection system that projects an image in a reduction-side conjugate plane onto an enlargement-side conjugate plane, the projection system comprising:
a first optical system; and
a second optical system disposed on an enlargement side of the first optical system,
wherein the first optical system includes a first lens group having positive power, a second lens group disposed on the enlargement side of the first lens group and having negative power, and an optical path deflector disposed between the first lens group and the second lens group,
the second optical system includes a reflection member having a concave reflection surface,
the second lens group includes three aspherical lenses, and
Conditional Expression (1) below is satisfied, $$0.25<|F|\times FNO/Y\max<0.5 \tag{1}$$

where F represents a focal length of entirety of the projection system, FNO represents an F number of the projection system, and Ymax represents a maximum image height in the reduction-side conjugate plane, and
wherein the first lens group includes an aspherical lens.

3. The projection system according to claim 2,
wherein the three aspherical lenses in the second lens group each have a rotationally symmetric surface with respect to an optical axis of the second lens group.

4. A projector comprising:
a light modulator that is disposed in the reduction-side conjugate plane and modulates light emitted from a light source; and
the projection system according to claim 2 that projects the light modulated by the light modulator.

5. A projection system that projects an image in a reduction-side conjugate plane onto an enlargement-side conjugate plane, the projection system comprising:
a first optical system; and
a second optical system disposed on an enlargement side of the first optical system,
wherein the first optical system includes a first lens group having positive power, a second lens group disposed on the enlargement side of the first lens group and having negative power, and an optical path deflector disposed between the first lens group and the second lens group,
the second optical system includes a reflection member having a concave reflection surface,
the second lens group includes three aspherical lenses,
Conditional Expression (1) below is satisfied, $$0.25<|F|\times FNO/Y\max<0.5 \tag{1}$$

where F represents a focal length of entirety of the projection system, FNO represents an F number of the projection system, and Ymax represents a maximum image height in the reduction-side conjugate plane, and
wherein an intermediate image conjugate with both of the reduction-side conjugate plane and the enlargement-side conjugate plane is formed between the first optical system and the second optical system.

6. The projection system according to claim 5,
wherein a first lens disposed in a position closest to the enlargement side in the second lens group is made of glass.

7. The projection system according to claim 5,
wherein the reflection surface is an aspherical surface, and
Conditional Expression (3) below is satisfied, $$10<Fm/|F| \tag{3}$$

where Fm represents a focal length of the reflection surface.

8. The projection system according to claim 5,
wherein Conditional Expression (4) below is satisfied, $$-120<FL1/|F|<-30 \tag{4}$$

where FL1 represents a focal length of a first lens disposed in a position closest to the enlargement side in the second lens group.

9. The projection system according to claim 5,
wherein Conditional Expression (5) below is satisfied, $$30<RL1S2/|F|<100 \tag{5}$$

where RL1S2 represents a radius of curvature of a reduction-side surface of a first lens disposed in a position closest to the enlargement side in the second lens group.

* * * * *